United States Patent [19]
Carlstrom

[11] Patent Number: 5,875,264
[45] Date of Patent: Feb. 23, 1999

[54] PIXEL HASHING IMAGE RECOGNITION SYSTEM

[75] Inventor: David L. Carlstrom, Fayetteville, N.Y.

[73] Assignee: Kaman Sciences Corporation, Colorado Springs, Colo.

[21] Appl. No.: 722,390

[22] Filed: Sep. 30, 1996

Related U.S. Application Data

[63] Continuation of Ser. No. 187,828, Jan. 27, 1994, abandoned, and a continuation of Ser. No. 163,814, Dec. 3, 1993, abandoned.

[51] Int. Cl.$^6$ .................................................. G06K 9/00
[52] U.S. Cl. ................................. 382/181; 382/276
[58] Field of Search ................................. 382/100, 181, 382/276, 277, 278, 218; 345/192, 193, 517

[56] References Cited

U.S. PATENT DOCUMENTS

| | | | |
|---|---|---|---|
| 3,260,995 | 7/1966 | Hempel | 340/146.3 |
| 3,601,803 | 8/1971 | Ullmann | 340/146.3 |
| 3,810,162 | 5/1974 | Ewing, Jr. et al. | 340/172.5 |
| 3,873,972 | 3/1975 | Levine | 340/146.3 |
| 4,014,000 | 3/1977 | Uno et al. | 340/146.3 |
| 4,075,605 | 2/1978 | Hilley et al. | 340/146.3 |
| 4,218,673 | 8/1980 | Yoshida | 340/146.3 |
| 4,490,847 | 12/1984 | Aleksander et al. | 382/10 |
| 4,513,440 | 4/1985 | Delman | 382/30 |
| 4,560,974 | 12/1985 | Coleman et al. | 340/146.2 |
| 4,630,225 | 12/1986 | Hisano | 364/559 |
| 4,654,873 | 3/1987 | Fujisawa et al. | 382/9 |
| 4,680,802 | 7/1987 | Nishida et al. | 382/8 |
| 4,704,694 | 11/1987 | Czerniejewski | 364/513 |
| 4,760,604 | 7/1988 | Cooper et al. | 382/15 |
| 4,776,020 | 10/1988 | Kosaka et al. | 382/1 |
| 4,802,232 | 1/1989 | Juvin et al. | 382/21 |
| 4,845,765 | 7/1989 | Juvin et al. | 382/21 |
| 4,876,731 | 10/1989 | Loris et al. | 382/40 |
| 4,958,375 | 9/1990 | Reilly et al. | 382/14 |
| 4,977,603 | 12/1990 | Irie et al. | 382/34 |
| 5,054,093 | 10/1991 | Cooper et al. | 382/14 |
| 5,063,605 | 11/1991 | Samad | 382/44 |
| 5,173,948 | 12/1992 | Blackham et al. | 382/44 |
| 5,276,741 | 1/1994 | Aragon | 382/40 |
| 5,392,363 | 2/1995 | Fujisaki et al. | 382/13 |

OTHER PUBLICATIONS

*The Turing Omnibus*, by A.K. Dewdney, Computer Science Press, 1989.

*Primary Examiner*—Yon J. Couso
*Attorney, Agent, or Firm*—McCormick, Paulding & Huber

[57] ABSTRACT

A character recognition system employs a "hashing" technique of imaged pixels wherein a digital image constituting an array of pixels is divided into a series of sub-arrays. The sub-array digital signal patterns themselves correspond directly to addresses in associated system memories. Each memory address indicates a predetermined set of the possible characters. There is an apparatus for combining the list of possible characters so that signals corresponding to only one character are output.

58 Claims, 11 Drawing Sheets

PIXEL HASHING IMAGE RECOGNITION SYSTEM

This is a continuation of application Ser. No. 08/187,828 filed on Jan. 27, 1994, now abandoned, Attorney Docket No. S27-790-1 and Ser. No. 08/163,814 filed on Dec. 3, 1993, now abandoned. Attorney Docket No. S27-790.

TECHNICAL FIELD

This invention relates to character or image recognition systems generally, and more particularly to character recognition systems that employ hashing algorithms.

BACKGROUND OF THE INVENTION

Character recognition systems are well known in the art and are characterized by an apparatus which decodes received optical signals corresponding to characters or geometric figures into electrical signals which can be manipulated in word processors or the like.

An example of known systems is set forth in U.S. Pat. No. 3,873,972. Disclosed therein is a character recognition system which employs analytic techniques to develop a set of codes representative of the geometry of a character by means of a two-dimensional matrix of digital video pixel elements. Codes are used to identify types of segments and groups of segments in each row or column of the matrix, sequences of such segments and the durations and orientations of sequences. The '972 system further includes an apparatus that operates in a learn mode to relate the codes to known characters and a process mode to recognize unknown characters from previously learned codes.

Another example of a known character recognition technique is disclosed and claimed in U.S. Pat. No. 3,840,856. The '856 method identifies a presented character after optical scanning of a substrate to yield an array of voltages representative of the information content of incremental elements that collectively form the presented character. The array of voltages are quantized at plural quantization levels whereby a corresponding plurality of data field geometric configurations are developed. The data field geometric configurations are presented by binary signals and are in approximate conformity with the geometric pattern of the presented character. Each data field geometric configuration represents a normalized scan pattern, thereby compensating for non-uniformities in the presented character. The information content of discreet areas of the plural data field the geometric configurations is compared in sequential matter with predetermined characters and the compared discreet area is characterized as one of the predetermined characters in response to a favorable comparison. The presented character is identified as a known type when a sequence of characterizations is obtained in a preestablished order associated with that known type.

Prior art systems as exemplified by those set forth above are characterized by a method and apparatus which attempts to identify the specific character, element or geometric figure that has been received. In that regard they seek to determine character or geometric features such as edge transitions, and assemble therefrom a sequence of segments each having a geometric relationship to other segments. Initially, known systems must be taught through a training algorithm what each sequence of segments and/or curves correspond to which characters or geometric figures. Consequently known prior art systems require an intermediate step of recognition achieved by an analysis of code segments edge transitions, etc.

It would advantageous to have a character recognition system which would directly correlate a received pixel pattern with a character or geometric figure without an intermediate step of analyzing component or segment parts. The present system is drawn toward such an invention.

SUMMARY OF THE INVENTION

It is an object of the present invention to provide a recognition system which directly correlates a received pixel pattern with a specific character or geometric shape.

It is another object of the present invention to provide a system of the foregoing type which employs a pixel pattern as a memory address, thereby enabling the use of hash based retrieval routines for recognition purposes, i.e. "pixel hashing".

It is another object of the present invention to provide for a system of the foregoing type wherein scanned signals corresponding to individual pixels are configured in a pixel array which is thereafter divided into a series of sub-arrays, each of whose pixel patterns directly corresponds to a unique address in respective memory portions (i.e., sub-memories).

It is an object of the present invention to provide a system of the foregoing type wherein the address from each pixel sub-array interrogates its respective memory to provide a set of possible characters or geometric shapes which, when the sets are combined, indicate a single character or geometric shape as a solution.

It is a further object of the present invention to provide a system of the foregoing type which processes signals indicative of a single overall target pattern previously imaged at select distances from a reference to provide signals indicative of the target's present distance.

Still another object of the present invention is to provide a system of the foregoing type which processes images of an object at select rotational or translational positions as compared to an origin to provide signals indicative of the object's present position and orientation.

According to the present invention, a system for pattern recognition includes an apparatus for receiving a sequence of signals configured in a signal array, including signals denoting an overall pattern. There is an apparatus for configuring the signal sequence into a plurality of signal sub-arrays, with each of the signal sub-arrays having a digital pattern corresponding to a portion of the overall pattern. A hashing mechanism is provided for mapping each of the signal sub-array digital patterns to an associated memory portion (sub-memory) having, at memory addresses therein, sets of stored signals corresponding to the possible overall patterns. There is also an apparatus for combining the several sets of possible overall pattern signals and generating therefrom a single set of signals indicative of the overall pattern.

DESCRIPTION OF THE PREFERRED EMBODIMENT

Figure 1:
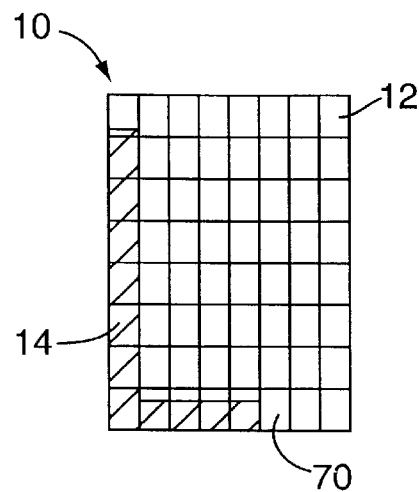
FIG. 1 is a simplified diagrammatic illustration of a pixel array containing a character processed by an image recognition system provided according to the present invention.

Referring now to FIG. 1 there is illustrated in simplified schematic form an array 10 of pixels 12. Generally, the array is of an arbitrary N × M size, with the illustrated example shown being 8×8 in magnitude. The pixels are binary in state, with a "1" corresponding to a black pixel and a "0" corresponding to a white or clear pixel in the Figure, although the reverse is an alternative configuration. The binary representations are generated in a known way, for example by using a digital (CCD) camera or by a conventional scanner. Alternatively, non-digital data from, for example, an acoustical image can be processed by employing additional, known signal processing hardware. The pixels for the entire array corresponds to an image 14 of an upper case letter "L" in a standard font.

When presented with a similarly configured array of pixels, known character recognition systems seek to identify the constituent parts of the character as features by, for example, identifying edge segments by respective light to dark transitions. Thereafter, the structural relationships among these feature segments are analyzed to identify the best match with prestored character or geometric shape or figure models. Two important aspects of the present invention as compared to the prior art are that the present invention simply skips the intermediate steps of identifying feature segments and feature to model analysis. Instead, the present invention relies on a "hashing" technique in which the individual pixels correspond to addresses in memory. Information identifying the character is located at that address. A simplified view of an image recognition system provided by the present invention is described hereinafter with respect to FIG. 18.

Traditional hashing concepts are best understood in the context of database searching and sorting processes as they are intimately related. Searching and sorting are normally paired processes in that the only reason for sorting a set is to simplify a later attempt to search for one or more of its elements. Since elements usually have many features, one of these features must be selected as the basis for the sort. The selected feature, known as the "key", should be the one most likely to be of interest in a later search. For example, in a telephone directory, the "key" is the last name or family name. Secondary and higher order "keys" are also used. This simply means that all entries with the same primary "key" are further sorted with the secondary "key". In the telephone book example, the first name is usually a secondary "key" and the middle initial is a tertiary "key".

If a list of items is sorted, the most powerful search technique is to check the middle of the list for the desired item. If it is not the correct item, its value can be used to throw away half of the list, i.e. the value of its "key" can be compared with the desired value to determine if the desired value is above or below it in the list. The process then is repeated by taking the middle of the remainder of the list. Since the process splits the remainder of the list in half with each test, it is known as binary search. The item will either be found or shown not to be in the list, in log (base 2) of N steps, where N is the number of items in the list. The computational complexity of binary search is of order $\ln_2 N$.

If a list has not been sorted, it must be assumed to be in random order and the search technique must check every item in a linear scan of the list with complexity on the order of N (i.e., O(N)). The difference between N and ln N can be realized by comparing the length of a number to its maximum magnitude for that length. The length is always the log (base b) of the maximum amplitude where the b is the base of the number system, i.e. decimal is base 10, binary is base 2, etc. If a list had 1 million items, a linear search would require 1 million steps, but a binary search would only require 20 steps.

A problem occurs with this sort and search strategy if the list is quite dynamic, meaning that items are added to and removed from the list with such frequency that the list must constantly be resorted. In this situation, "hashing" techniques provide powerful and often necessary alternatives to sorting and searching algorithms. However, even a static list requiring no periodic resorting can use hashing to improve upon the optimal binary search (logarithmic) complexity. In the ideal case, "hashing" can retrieve the correct answer in 1 step, or O(1), independent of the list length N.

"Hashing" requires that the memory location or address where an item is stored can be computed exactly as a function of the "key". As a simple example, consider a list of finishers in a race. If their names are stored in an array such that the array subscript or cell location corresponds to their finishing position in the race, then in 1 step the person who finished in any given position can be retrieved. If the identity of the runner who finished 5th is desired, the 5th location in the array is readout.

If this structure is inverted so that the name is used as the "key" rather than their finishing position, the problem becomes somewhat more difficult. An address or subscript can be computed by assigning a number to each letter of the alphabet (A is 1, B is 2, C is 3, . . . , Z is 26) and then converting each name to a number. This is essentially a base 26 number system; if 10 letters are allowed for each name then $26^{10}$ addresses are required in the array. Each of these array locations would contain the finishing position in the race and therefore given a name the finishing position could be retrieved in 1 step. Unfortunately, 26 to the 10th power is an intractable number, i.e. approximately 142 trillion.

In spite of this difficulty, "hashing" is still widely used. Although in theory 142 trillion addresses are needed, in fact there may be only 100 names in the list The idea is to find some mapping that will produce a more compressed set of addresses from the possible values of the "key". This mapping is done by "hashing functions". Techniques have been developed to provide effective "hash functions". The disadvantage of known systems is that successful address space compression is only achieved with an increasing risk of collisions. Collisions occur when two different "keys" map to the same address. While several techniques exist for coping with collisions, they typically involve a pointer from the hashed address location to a separate linear list of all the items that collided. Collision resolution algorithms are set forth in "data structure techniques" by Thomas A. Standish published by the Addison Wesley publishing company at chapter 4, in general, and section 4.3 in particular.

An important point of departure of the present invention over the prior art allows a pixel pattern to be considered as a number which can be directly used as a "hash" address. Any property that can correctly be associated with that unique pattern can then be stored in the array location pointed to by that address. As detailed hereinbelow, the set of properties that can be correlated with the pattern in this manner is quite large and varied. In fact, any property that can be defined as a function of the pixel pattern can be represented, including properties linked through "composite" function constructs. As used herein, composite functions are those in which the dependent variable in one function constitutes the independent variable in another. For example, a composite function can be used to replace a property such as the "area" of a balloon inflated to various levels with a new property, its internal pressure.

Those skilled in the art will note that the array of pixels shown in FIG. 1 corresponds to an ordered table or list of the type set forth above that can be mapped to a linear array of binary values thus forming a binary number. There are N×M factorial ways to provide this mapping if each pixel is mapped once and only once without overlap. The binary number then becomes the "key" to a recognition table, just as the last name is the "key" used in a telephone book. There are several known techniques for searching an ordered table, the simplest being a binary search detailed above. With the alternative "hashing" technique, individual addresses correspond directly and uniquely to the key to the desired information. Hashing allows a searcher to directly examine the table location defined by the key without examining irrelevant entries, entirely avoiding the trial and error process.

The obvious drawback with known hashing routines is that the number of hash generated memory addresses or keys needed for specific applications can be so large as to limit real world applications. "Keying" on social security numbers is an example, since it mandates an enormous number of addresses, one billion addresses. Hashing functions are used to achieve significant compression since the database normally contains only 100 to 1000 names. The problem with hashing as described above is more onerous for character or image recognition applications since the camera image corresponds to a separate n by m array of pixels whose corresponding digital signature (n by m array of bits) would be an address in a table having $2^{n \times m}$ entries. Even for an array of dimension 8 by 8 such as shown in FIG. 1, the number of entries is 18 billion billion.

Image recognition can be modeled as a function. Each possible bit pattern in a window of interest becomes a unique value of the input variable to the function which must then return the correct output. This can be seen more easily if the pixel array, overlaid on the character, is mapped into a linear array. For the example of FIG. 1, an 8×8 character window can map to a linear array by scanning the window from left-to right and top-to-bottom to produce a 64 bit number with $2^{64}$ possible values. Since functions can be implemented with tables, the problem can be solved by entering during a training mode the correct response in the table for each possible binary number.

Such a table can in theory be implemented on a computer by building a hash table where each of the $2^{64}$ possible values is actually a separate memory address which has stored in it the "correct" response, such as the ASCII code for the letter "L". Since more than one way exists to write the letter "L", this response would be located at multiple locations in memory, thus capturing the stylistic variations on the letter "L". A function table or look-up table can be shown to be equivalent to anything that can be achieved with neural nets when neural nets are restricted to binary inputs. If one takes a "black-box" view of function implementation, what is inside the "box" does not matter as long as it provides the correct function mapping.

For an 8×8 array as illustrated in FIG. 1, the given configuration of pixels form an L of a selected font and correspond to a unique memory address. However, the number of possible addresses is $2^{8 \times 8}$, or $2^{64}$, a number so large as to render implementation of this hashing technique impracticable, if not impossible. This conclusion was reached by Texas Instruments as seen by way of reference to the disclosure in U.S. Pat. No. 3,810,162 and by Levin in the '972 patent referenced above.

Figure 2:
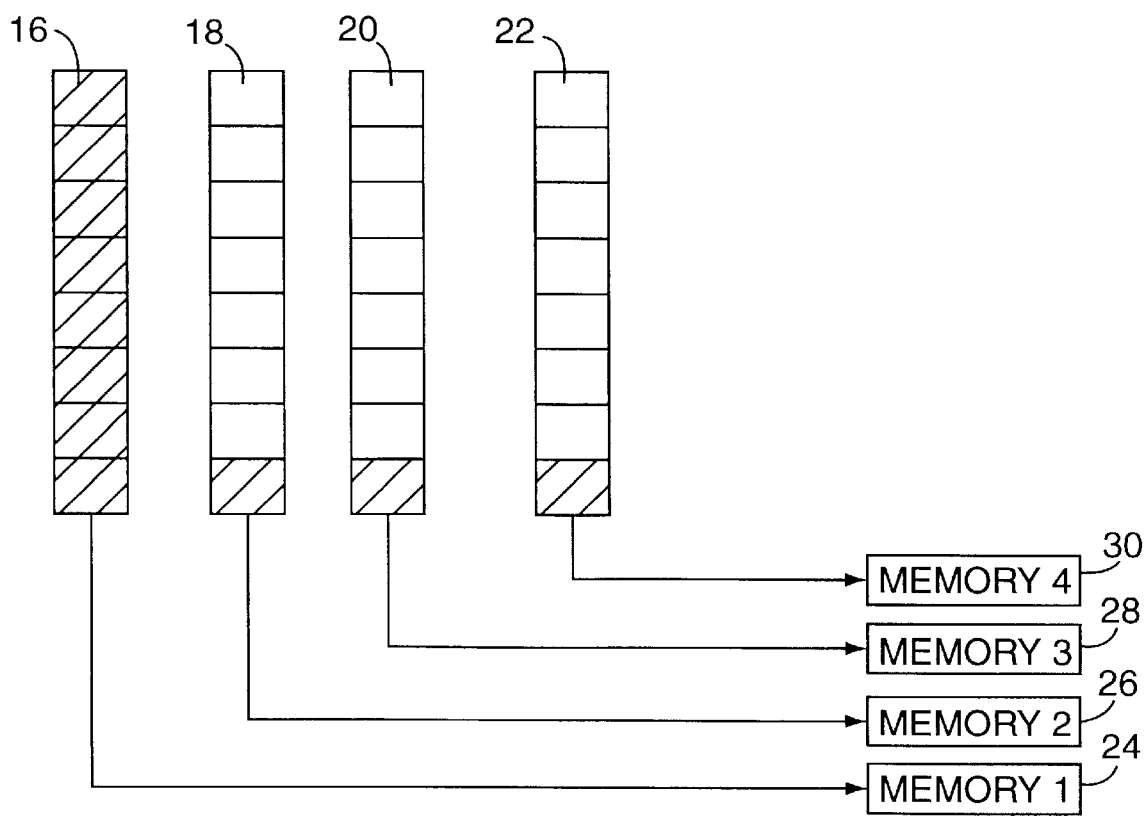
FIG. 2 is a more detailed illustration showing a portion of the pixel array of FIG. 1.

The present invention solves this tractability problem by dividing the array into a series of eight sub-arrays, of which four left-most sub-arrays 16–22 are shown in FIG. 2. Each sub-array then has a vastly smaller number of addresses to which the 1 by M bit array will point In the example of FIG. 1, each array is 1×8 bits in size so that there are $2^8$ possible unique addresses. The number of addresses is smaller (256) and can easily be manipulated by even the least powerful of computers.

In general, the number of memory addresses required is K * $(2^n)^{1/k}$ where n is the number bits in the total N×M pixel array or "window" and K is the decomposition factor. Address compression is achieved by the decomposition factor K even though it appears as a multiplier in the calculation because the division by K in the exponent is actually the $k^{th}$ root of the original 18 billion billion address requirement. With K=8, the 8th root of 18 billion billion is 256 which is then multiplied by K to yield 2048 addresses. The number of bits per sub-array is n/K The value of K can be any value that produces the optimal memory hardware trade-off. Having solved the address tractability problem, the present system must recombine the sub-memories to correctly model the recognition function. With the present system, each memory address will not necessarily correspond to a unique character or figure, but will most probably return a set of several characters or geometric shapes or figures, i.e., a hypothesis set.

Figure 3:
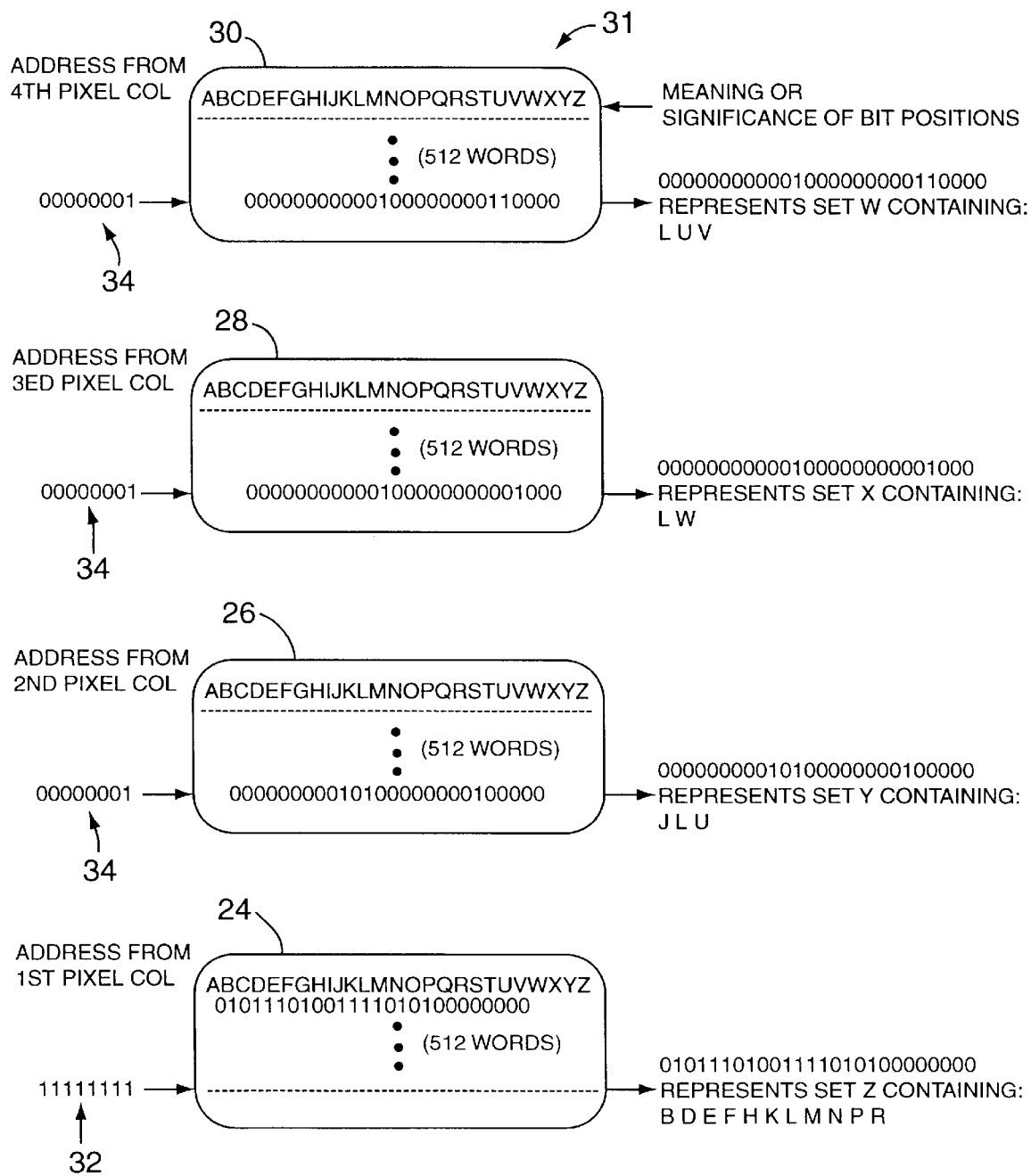
FIG. 3 is a diagrammatic representation of selected memories and addresses contained therein used by the system of FIG. 1.

As shown in FIG. 2, each sub-array 16–22 has an associated memory 24–30 which generally comprises a portion of a larger memory unit. Within these portions or sub-memories, each bit sequence address corresponds either to the correct character or to a set which contains the correct character 31 (i.e., hypothesis set) for each memory as illustrated in FIG. 3. In FIG. 2, sub-array 16 is "1" for each bit. The corresponding memory 24 selects the address 32 value, of 256, in which are stored a bit set that corresponds to the set of Z possible characters. Those skilled in the art will note that many letters (12 or more for certain fonts) have a leading vertical stroke, generating dark pixels when scanned, and which thereafter are recorded as eight "1" signals in the eight bits of the sub-array 16. Similarly, memories 26–30 have equivalent addresses 34, with a value of 1, which respectively map to the character sets W, X and Y. Each memory returns its full set of possible characters to the combining circuitry 216, FIG. 18. This analysis is the same for the remaining sub-arrays of the array 10 and their respective memories.

Figure 4:
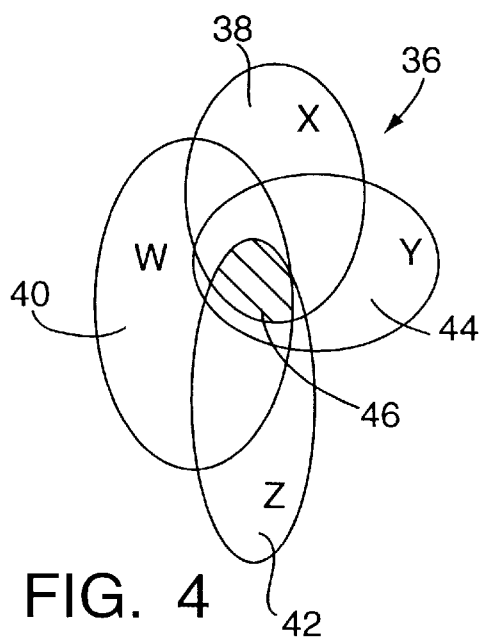
FIG. 4 is a diagrammatic illustration of the intersection of the characters indicated by the individual memory addresses shown in FIG. 3.

The signals indicative of possible characters are combined in a set intersection operation (i.e., the words are bit-wise logically AND'd) by the combining circuitry 216 to yield a single character or possible characters, depending on the circumstances. In other words, each memory "votes" for the possible set of characters identified by that address and the combining circuitry 216 declares the "winner" to be the characters with unanimous "votes". The operation is shown conceptually in FIG. 4. Set forth therein is a Venn diagram 36 comprised of geometric representations of the hypothesis sets of possible letters returned by the indicated addresses in the memories 24–30. Sets 38–44 respectively correspond to the possible letters indicated by the memories. The intersection set 46 comprises the single letter "L".

Accordingly, the present invention has overcome a major limitation of the prior art and provides a system of character or image recognition by direct hashing of pixels. It will be understood by those skilled in the art that the present invention differs significantly from those hashing techniques now known. It has been standard practice in the art to assume, a priori, that a hashing solution such as provided by the present invention was not feasible. Consequently, hashing in a restricted form has been incorporated in some prior art systems. These known systems hash either from pixels to features or from features to recognition, but not both and characteristically rely on a subset of available keys. British Pat. 3,601,803 and U.S. Pat. No. 3,810,162, for example, hash pixels to features, while the '972 system hashes features to recognition answers. By only hashing a portion of the total recognition function, the prior art avoids the combinatorial explosion associated with $2^{64}$ addresses. However, in doing so they must forego the speed and simplicity afforded by the total pixel to recognition technique provided by the present system. See also *Object Recognition by Computer*, by W. Eric L. Grimson, The MIT Press, 1990, Chapters 1–2 and *Robot Vision*, by Berthold Horn, K. P., The MIT Press, 1986.

Operation of the present system presumes the memory locations contain the correct information; i.e. that the system has been properly "trained". The memories are loaded with the correct information during a training cycle. As each unique pattern of interest is placed in front of the sensor, all of the memories are loaded at the corresponding addresses with the correct response(s) for that pattern. For example, if after initialization, the system had previously been trained with "B" and "H", then memory 24 would generate a hypothesis set with those characters for the example of FIG. 1. The character "L" must be added to this set without deleting either "B" or "H". In the preferred embodiment, this is accomplished with the set union operator to preserve prior training information that may be stored at the same address, i.e. the new response word is, bit-wise logically "OR'd" with prior responses that were already trained into the same address location.

Referring again to FIG. 3, the memories contain words whose width in bits corresponds to the set "universe" of all possible responses. In FIGS. 1–4, there are 26 letters so the word in memories 24–30 are 26 bits wide. For other applications where additional information is desired, such as letters and numbers, rotated letters, etc., the word width would be increased.

Note also that the present invention also encompasses embodiments in which the training operation can be continued during recognition operation. Should the system encounter an unknown overall pattern, that is the intersection set of pattern responses is empty, the present system will store the new desired response in the associated memories at address. values corresponding to the new pattern portions. Thereafter, when presented with that pattern, the system will generate output signals indicating recognition.

Figure 5:
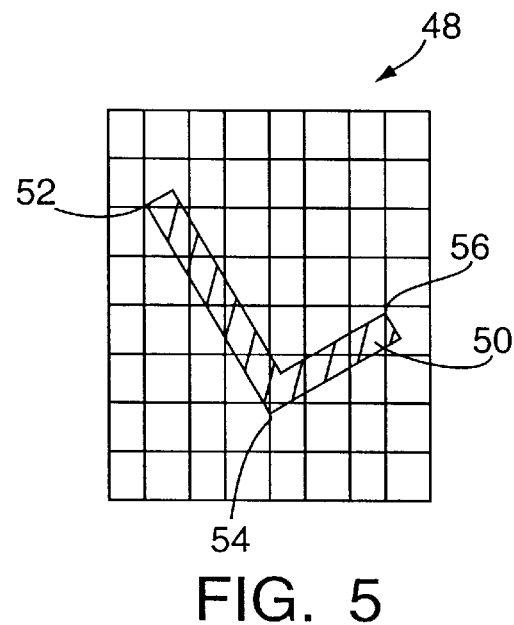
FIG. 5 is a simplified schematic illustration of a pixel array processed by a system provided according to the present invention in which a character is rotated.

Referring now to FIG. 5, there is shown in simplified schematic form a pixel array 48 of the type described herein above. The pixel array 48 contains signals corresponding to the letter "L" 50 as shown with respect to the earlier Figures, but with the letter rotated about an origin 52. Prior art systems use extensive computations in an attempt to determine the amount of rotation as well as the point about which the letter is rotated. However, a system provided according to the present invention is easily capable of in generating a series of addresses which directly correspond to the letter rotated incremental amounts (e.g., 10 degree intervals). If 10 degree increments are employed the hypothesis set contains the numbers 1–36 rather than the letters A–Z as with the example of FIG. 3. An additional feature of this invention is to represent the rotation angle as a binary set; instead of the set of the "1" to "36" the set of $\{b_5, b_4, b_3, b_2, b_1, b_0\}$ can be used. The rotation increment "1" to "36" is now converted to binary before being loaded into the memories. Both techniques are embodied in this invention since the 1st technique supports collisions, i.e. multiple responses and the 2nd binary method does not. However, the 2nd method is more memory efficient, i.e. it uses 1n (base 2) of the memory word length of the 1st technique.

An additional technique of this invention is to include "truncation" or "round off" during training so that a response is always guaranteed. For example, if a system only requires a response accuracy of 10° increments and the input figure is at 9° the response will be null. However, if during training, all possible cases, down to the rotation resolution limit of the pixel density, are presented to the camera a response can be guaranteed for every possible case. Since 9° can not be stored in the sub-memory hypothesis set it must either be truncated to 0° or rounded to 10°. Both techniques are embodied to support applications as appropriate, e.g. for continuously moving dock hands resolved to 30° increments, the hour hand must be truncated to the last of 12 hours, but the minute hand must be rounded to the nearest 5 minute increment. This many-to-one mapping of all possible inputs to a small set of outputs is a powerful feature of the present invention whether considering a multiplicity of angular cases or a multiplicity of character styles.

Similarly, the present system can be readily configured to contain memories with addresses which point to characters which are linearly displaced with respect to an initial origin, rotated as above but with respect to several origins such as points 54, 56. Displacement distances can also be binarized for memory compression where the application permits. Equivalently, the present system can be configured to contain memories with addresses which point to character images which are defective; that is, characters with nicks or line breaks, or which may touch an adjacent character. Other variations and combinations of the above can be easily incorporated with the present invention.

If the letter "L" is rotated through 360 degrees about its centroid, each of these positions can actually be thought of as a different letter. In fact, the letter "L" in some fonts can be thought of a "7" rotated through 180 degrees. Therefore, during training the letter "L" is rotated in 10 degree increments. At each position, the angular rotation is stored in all the sub-arrays for the corresponding pixel pattern. When the same pattern is viewed in a recognition mode, the correct angular label will be returned. The rotation angles actually become naming labels and the correct response is generated by the standard object recognition function mapping.

Figure 6:
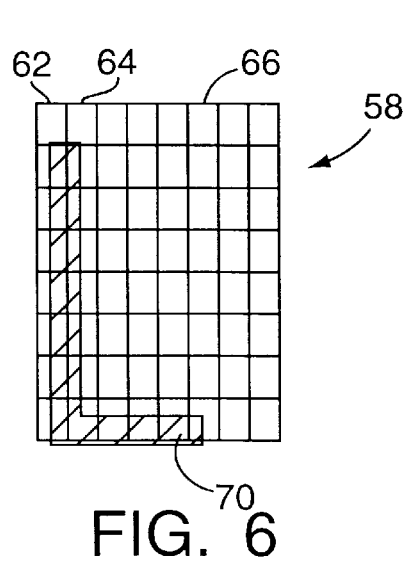
FIG. 6 is a simplified illustration of a pixel array processed by a system provided according to the present invention in which the character is co-extensive with a plurality of adjacent sub-arrays.
Figure 7:
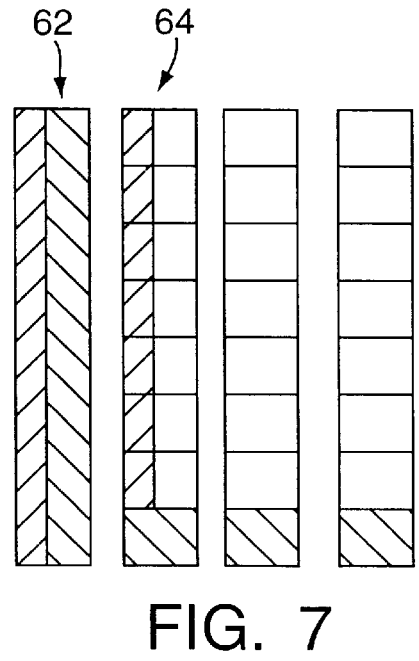
FIG. 7 is a more detailed illustration of a portion of the pixel array of FIG. 6.

FIG. 6 is a simplified schematic illustration of a pixel array of the foregoing type in which a character 60 overlaps adjacent sub-arrays 62, 64. FIG. 7 is a more detailed illustration showing a portion of the pixel array 58 of FIG. 6. A first portion of a vertical stroke 66 resides in sub-array 62 and a second portion of the array resides in the adjacent sub-array 64. The remainder of the character image is the same as shown with respect to the character of FIG. 1, with the exception of sub-array 66 which receives a portion of the horizontal stroke 68. In contrast, the character 14 of FIG. 1 does not extend into sub-array 70, the sixth columnar sub-array in pixel array 10.

Under certain circumstances, the present system must be trained for both the situations represented by FIGS. 1 and 6 to more completely insure recognition That is; both hash address memory combinations contain the character "L", requiring training for the situation shown in FIG. 6 as well as other variations thereof. Alternatively, an embodiment of the present invention may not be able to detect the presence of the vertical stroke because light received by detectors may be below the triggering threshold. To counter this possibility and reduce training requirements, the present system combines signals from adjacent sub-arrays to provide a more positive determination of the presence of a character. As shown schematically to FIGS. 8, 9, 10 and 11, the present invention contemplates a system configuration where corresponding pixel magnitudes in adjacent sub-arrays are combined through an "OR" operation to compensate for this fairly common occurrence.

Figure 8:
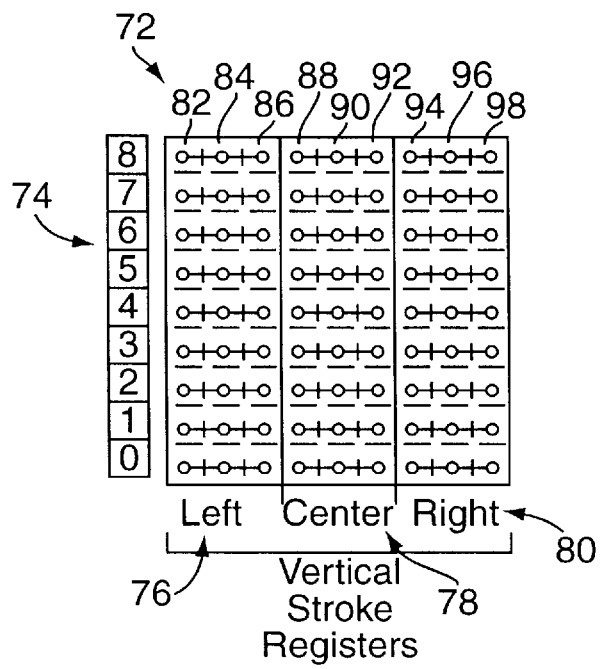
FIG. 8 is a simplified diagrammatic illustration of a pixel array processed by the present invention wherein adjacent sub-arrays are grouped into a single pixel or "bit" array.

Referring now to FIG. 8, there is shown schematically, a pixel array 72 of the foregoing type in which signals from adjacent sub-arrays are combined on a pixel by pixel basis to create a sequence 74 of bits for groups of sub-arrays. In FIG. 8, the array 72 is seen to be 9 by 9 in dimension. Three adjacent sub-arrays comprise a group, yielding for array 72 left, center and right vertical stroke groups 76–80 respectively comprised of sub-arrays 82–86, 88–92 and 94–98. Sequence 74 is representative of three registers; left, center and right strokes. The pixel signals in a group are combined such that the pixels in a given group row are logically OR'd to merge slight input variation into a common hash address to insure character detection, since it is possible that only one of the three adjacent pixels in the array group are enabled. It is alternatively possible that any one, two or three pixels in a group row could represent the left stroke of a character, because of character thickness variations. In all of these cases, the same address is generated, greatly reducing the number of required training input cases and the thereby the training time.

Figure 9:
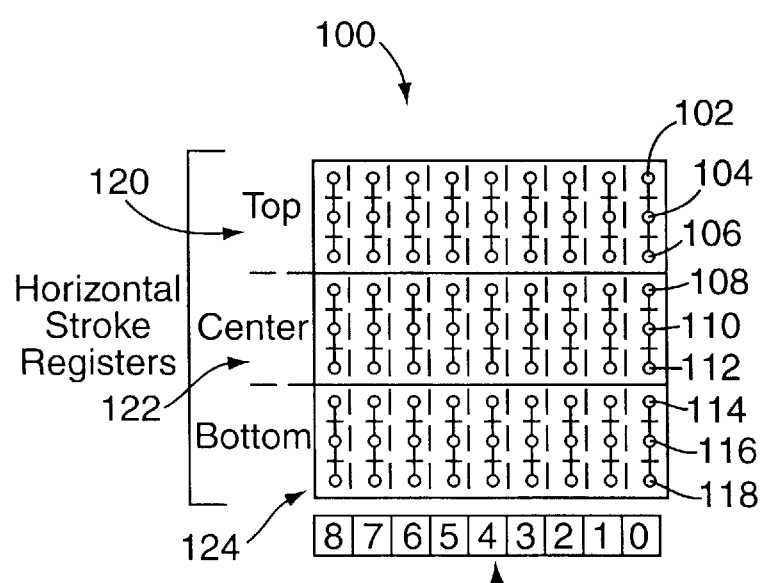
FIG. 9 is a simplified diagrammatic illustration of a pixel array processed by a system provided according to the present invention in which the adjacent grouped sub-arrays are horizontal.
Figure 10:
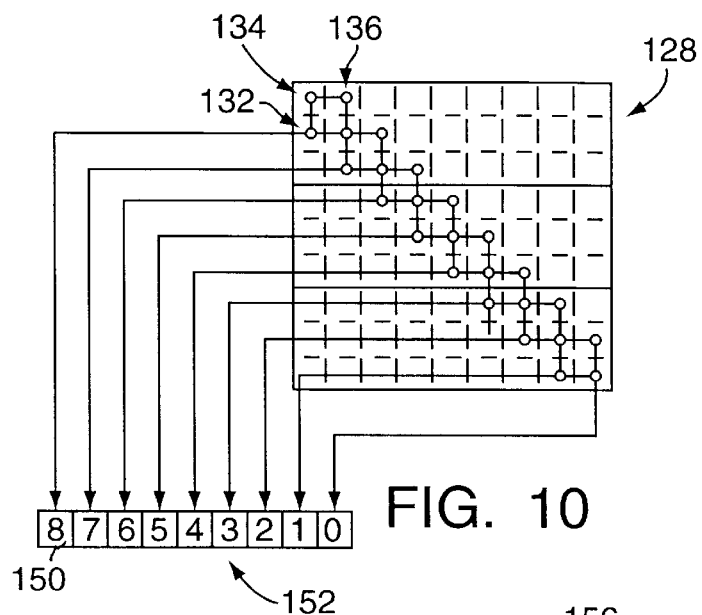
FIG. 10 is a pixel array of the type shown with respect to FIGS. 8 and 9 in which the adjacent grouped sub-arrays extend diagonally.
Figure 11:
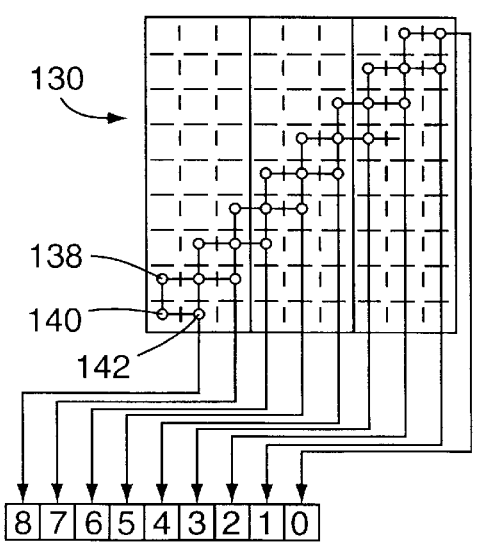
FIG. 11 is a simplified illustration of a pixel array of the type shown in FIGS. 8, 9 and 10 in an alternative diagonal grouping.

FIG. 9 illustrates a pixel array 100 in which the present system employs an alternative sub-array configuration and grouping scheme wherein the sub-arrays are rows 102–118 of horizontal pixels, with three adjacent rows creating top, middle and bottom groups 120–124. Bit sequence 126 is constructed as described with respect to FIG. 8 and also represents three registers, top, middle and bottom strokes. There is no requirement that the sub-array configuration be limited to simply orthogonal orientations of sub-arrays. FIGS. 10 and 11 illustrate pixel arrays 128 and 130 wherein the sub-array extend in diagonal directions. Sub-arrays 132–136 descend diagonally, while sub-arrays 138–142 ascend a diagonal of array 130. Pixels 144–148 in array 128 are combined, as above, to yield bit 150 in bit sequence 152. A similar analysis is performed with the respect to the pixels in pixel array 130. The current embodiment also includes pixel mergings that respond to large circle, upper circle and lower circle registers. Note that the pixel-to-address hashing scheme is no longer 1-to-1 mapping, but is many-to-many. This increases the number of mappings beyond the n×m factoral limit discussed above, but does not alter the concept of intersecting the hypothesis sets returned from hashed addresses in respective memories. The principal effect is to provide generalization in the pixel-to-address hashing function which significantly relaxes the training requirements for a given recognition performance rate, i.e. fewer input variations are possible at the hash address level so fewer cases need to be viewed by the camera during training.

Figure 12:
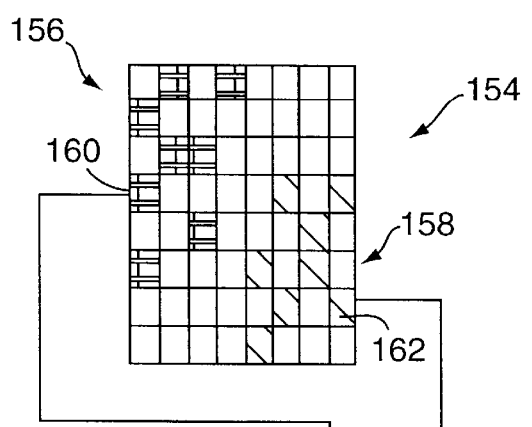
FIG. 12 is a simplified diagrammatic illustration of a pixel sub-array in which the sub-array pixels are arbitrarily selected from the overall pixel array.

The present invention can also formulate sub-arrays from pixels in a random orientation. FIG. 12 is a schematic illustration of a pixel array 154 of the foregoing type in which sub-arrays 156, 158 are, indeed, comprised of randomly selected pixels from the array arranged in an established relationship with respect to the other pixels in that sub-array. That is, pixels 160, 162 are selected to be the leading pixels 164, 166 in sub-arrays 168, 170 and hence, the leading bit in a memory address. These sub-arrays are consistently configured in this manner, a fact which enables the present system to consistently analyze an image and identify a character or figure. The requirements here are that (1) selected mapping of each pixel from the pixel array into a specific position in a sub-array and (2) respective memory assignments both be maintained between training cycles and all future recognition cycles. In this respect the present invention exhibits the flexibility that typifies certain biological systems. The optic nerve mappings from retinal pixels to visual cortex has been shown to vary significantly in some species without any recognition performance variations. A possible explanation is that the signals from receptors randomly located about the retina are processed consistently with respect to one another, allowing for a given signal sequence to be repeatedly recognized as a certain image. Another animal could achieve the same performance with a another random mapping.

Figure 13:
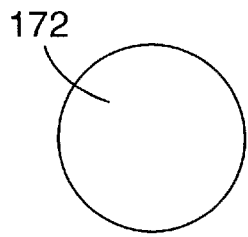
FIG. 13 is a diagrammatic illustration of a target placed on an object as viewed by an alignment system provided by the present invention.
Figure 14:
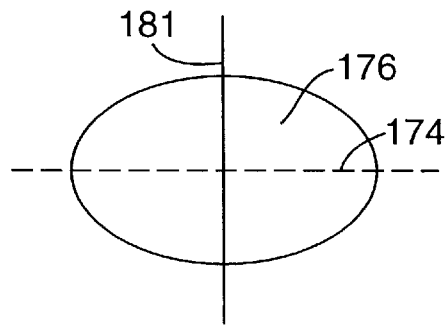
FIG. 14 is a first view of the target of FIG. 13 wherein the alignment system is rotationally misaligned about a first axis.
Figure 15:
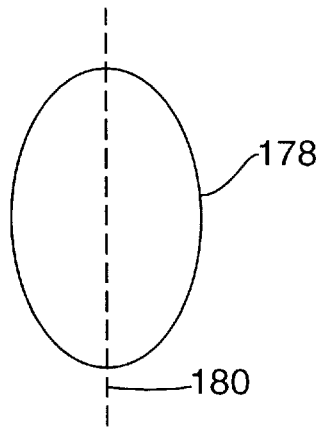
FIG. 15 is a simplified schematic illustration of the target of FIG. 13 wherein the alignment system is rotationally misaligned about a second axis.

Referring now to FIG. 13 there is shown a simplified illustration of a target pattern 172 for use in an alignment system provided according to the present invention. The present invention can be readily extended beyond simple alphanumeric character recognition systems, which are either in an organized rectangular presentation or are rotated or displaced with respect to an initial position, to a more complex alignment system useful in robotic vision or target identification and manipulation applications. For example, a target can have fixed thereto a pattern, such as the circle of FIG. 13. With a robot arm or retrieval mechanism controlled by the present alignment system, optical signals corresponding to the target figure are processed as detailed hereinabove. When the target is properly aligned, the image of the target pattern (a circle in the present example) will be read by the present system as undistorted as compared to a direct frontal view. Should the target be rotationally misaligned (e.g., about a pitch axis 174) a select amount, an ellipse 176 of a certain size is viewed by the present alignment system. The distorted image characterized in FIGS. 14 and 15 by foreshortening in the direction of rotation, will yield a unique set of hash addresses for the memories. These new memory locations will contain pitch rotation angle that must be removed to achieve proper alignment. The process is subsequently repeated as needed. Similarly, FIG. 15 contains an elliptical image 178 of the circle of FIG. 13 which has been rotated about a roll axis 180. The elliptical images of FIGS. 14 and 15 are somewhat enlarged for illustrative purposes. The present alignment system can readily resolve all non-orthogonal misalignments using the above technique.

Of course, a critical feature of any alignment system is its accuracy. The accuracy of the present system is not limited by the present invention, but is bounded only by the parameters of the associated sensor's pixel array. In general, the best possible angular accuracy will be the arc-tangent of the ratio of 1 pixel to the total number of pixels along the object in a given direction. As an example, if the surface containing line 181 is parallel to the camera's focal plane, and is tilted in pitch from the vertical as detailed above, the line will appear shorter to the camera. The smallest increment of change that can be detected is one pixel, i.e. the line must decrease in length by at least 1 pixel count before the change can be detected. The longer the line, the more accurate the angular measure. A change of 1 pixel in a length of 100 pixels represents a smaller angle than a change of 1 pixel in 10. The former case represents approximately 0.5 degrees of tilt, and the latter represents 5.7 degrees of tilt. Rotation accuracies about roll axis 181 are very similar, as described with respect to FIGS. 13–15.

The above accuracy examples assume that only one end of the imaged line is modified by the change in length requiring the center of rotation to be located at the non-changing end of the line. If the rotation center is at the middle of the line as assumed in FIG. 14, then both ends of the line experience asymmetric pixel position changes. Vertical or pitch tilt shortens both ends of the line, and the clockwise rotation moves the top of the line 1 pixel to the right, while the bottom of the line moves 1 pixel to the left. Therefore, only one half of the maximum line length should be used in accuracy estimates.

In general, if the rotation is about the centroid of the object or line, then only half of the line length is used in the accuracy calculation. A default convention for estimating accuracy is to assume that the rotation center is located at the centroid of the object or line, meaning that only half of the objects length in any direction is used in the arc-tan accuracy calculation. Other conventions may be equivalently adopted, depending on the application.

As noted above, accuracy is enhanced by maximizing the number of pixels in the focal plane, while minimizing each pixel's size. This could also be thought of as maximizing the density (pixels per unit area) of the focal plane. Thus, accuracy is limited by the state-of-the-art in sensor focal plane technology. Despite the criticality of focal plane pixel densities, split field-of-view optics can, for some applications, push beyond the above accuracy limits. For instance, in the above example, instead of viewing the entire length of the line on the planar surface, split optics can be used to merely observe the ends of the line. Now, a focal plane with only 500 pixels vertically might view both ends of a line that is actually 1000 pixels long. A change in length of 1 pixel would now represent a ratio of 1 in 1000, even though the focal plane was limited to a ratio of 1 in 500. Assuming that the rotation was at the centroid of the line this split optics system would achieve an accuracy of 8 minutes of arc, i.e., the arc-tan of 1 over 500.

The split optics embodiment actually trades off dynamic range for accuracy. Without split optics, the line would not shorten to zero length until the plane was vertically tilted by 90 degrees. With split optics, the middle of the vertical straight line is not viewed by the focal plane, therefore as vertical tilt is applied, about the center of the line, the line will disappear at a tilt of 45 degrees. Thus, accuracy is doubled by halfing the dynamic range from 90 degrees to 45 degrees. If an application needs full dynamic range, as well as the increased accuracy, then a dual system of coarse and fine optics could be used. The coarse system would provide full dynamic range at reduced resolution, and the fine system would provide the desired resolution in a critical alignment sub-range of the full dynamic range. In the general case, split optics could be applied in more than one direction.

The vertical planar surface can be optically split both horizontally and vertically. Consider an astronautical application which requires that a large flat panel be maintained in correct alignment with respect to a satellite or space station. A camera could be mounted on the space station with its optical axis perpendicular to the centroid of the flat panel. Each corner of the panel contains a calibration pattern, possibly a circle or a solid square which images to a 3×3 pixel array. The two dimensional split optics would map the four corners of the panel into the four quadrants of the focal plane. The central cross shaped pattern on the panel, created by removing the four corner calibration patterns, would not be mapped to the focal plane. Using the present invention, vertical tilt (pitch), horizontal tilt (yaw), rotation (roll), vertical displacement, horizontal displacement, and range (i.e. distance of the panel's centroid from the camera) can be obtained.

Figure 16:
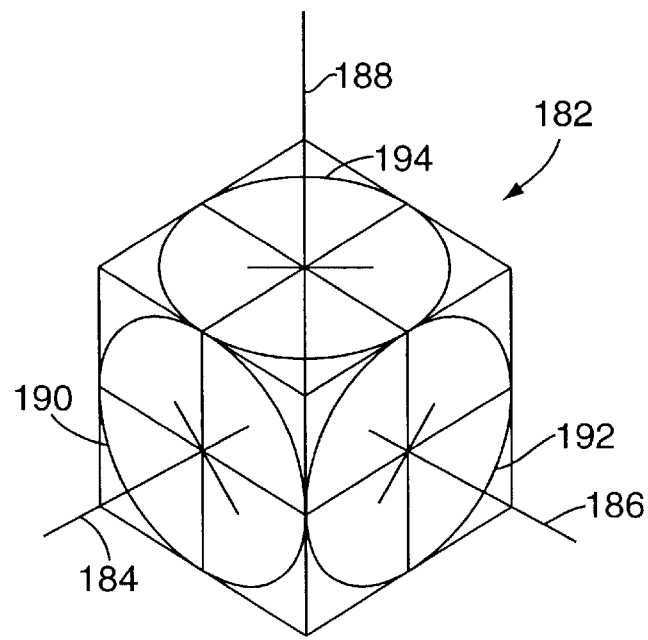
FIG. 16 is a simplified diagrammatic illustration of the target of FIG. 13 showing roll, pitch and yaw axes of rotation.

In a further embodiment of the present invention, a three-dimensional object 182 as shown in FIG. 16 can be imaged in a preferred position, as well as in a plurality of positions rotated about roll, pitch and yaw axes 184–188. The object can contain additional reference patterns such as circles 190–194 which appear as ellipses in FIG. 16. A two dimensional image silhouette of the three dimensional object can often serve as the reference pattern. When the object is rotated about each axis, a unique image is generated. Each image is processed as above, with different positions stored in selected memory addresses. Similarly, an object can be displaced along orthogonal displacement axes. As with respect to the alignment system illustrated with respect to FIGS. 13–15, combinations of rotational displacement as well as linear displacement can be readily determined by previously "training" the memories pointed to by the hash addresses.

The present invention is unique in several important aspects. It enables a single monocular camera to recognize the orientation of an object in a three dimensional space and thereby provide all data needed for the object's correct alignment. As an example, consider a robot arm that has been tasked to install an elongated pole-like object into a mounting hole on a planar surface. First, the camera views the planar surface and senses it's orientation in terms of pitch, roll, yaw, vertical displacement, horizontal displacement, and distance from the camera. Next, the camera views the end of the object in the grasp of the robot and senses the same set of position metrics. Movement signals are then passed to the robot arm that brings the two sets of metrics into proper correspondence, i.e. causing the part to become properly seated in the planar surface.

As the robot moves the part, the camera continues to track its position, modifying, if necessary, the instructions to the robot This example assumes that the planar surface is stationary, with respect to the camera's coordinate system, and therefore that it only needs to be viewed once. However, if the planar surface was also in motion, then its position could be sensed, alternately with the position of the robot-held part, before providing adjustments to the robot's positioning instructions.

This class of robotic problem is both well known and typical of robotic assembly tasks. Techniques for such tasks have been under development, by computer vision and scene analysis researchers, for many decades. Among the present invention's attributes as compared to the prior art are the speed and simplicity of it's approach, as the present system can easily senses the object's orientation parameters, for example, once per image frame, at a frame rate of 60 frames per second. This is possible because of the very low computation requirements of the present invention.

Figure 17:
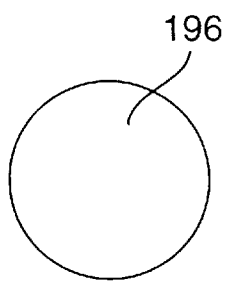
FIG. 17 is a simplified schematic illustration showing a target at several distances from a range finder system provided according to the present invention.
Figure 17:
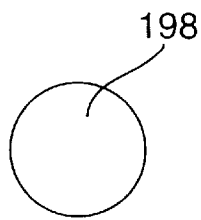
Figure 17:
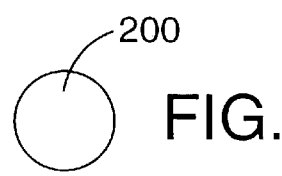

FIG. 17 is an illustration of a target pattern imaged by yet another alternative embodiment of the present invention used as a range finding device. In FIG. 17 there is illustrated a series of geometric patterns 196–200 (circles) located on the target. Each pattern corresponds to that recorded by a camera at a fixed distance from the target. The present invention simply converts the pixel signals for that image into hashing addresses that select memory locations containing signals indicative of the correct distance to the target. Alternatively, if the circle were a balloon at a fixed distance, the memories could return signals corresponding to the pressure within the balloon.

When the object is centered in a camera's filed of view, the resultant pixel hash registers in the embodiment of FIG. 17 will each point to a memory word that contains the distance to the centroid of the object. The contents of all of the hash memory locations are intersected, as above, to return the correct value. The changes in hash address are a function of distance rather than, for example, rotation angle. A distance variable is stored in the hash memory registers.

A binary coded set can be used to store this distance variable, with the most significant bit (MSB) having a weight equal to half of the required dynamic range and the least significant bit (LSB) having a weight equal to the required accuracy. The dynamic range of the system is not necessarily the distance to the object. That is; the object may be 50 feet from the camera, but only move between 49 and 51 feet. For this example, the MSB can be 1 foot. The LSB is limited by the pixel resolution of the camera. For any given magnification and range, a single pixel change in length will equate to the smallest depth change that can be detected by the system. While the LSB need not match this value, it should be smaller than this value. This limit is given by:

$$\Delta d = \frac{d_1 d_2 \Delta s}{fs}$$

where  $\Delta d$ = depth change
$d_1$ = 1st depth
= $d_2 - d_1 = \Delta d$
$d_2$ = 2nd depth
$f$ = focal length
$s$ = real object size
$\Delta s$ = smallest detectable change for imaged object, i.e., pixel width For the above example at 50 feet, the MSB would represent 1 foot, the 2nd bit 6 inches, the 3rd bit 3 inches, the 4th bit 1.5 inches, and the 5th bit 0.75 inches. If the 5th bit was the LSB, then this 5 bit representation could resolve any distance from 49 to 51 feet to an accuracy of ¾ of an inch.

In the embodiment of FIG. 17 it is presumed that the object being viewed is a sphere and, therefore, pitch, roll and yaw have no effect. For other shapes, however, many aspects of the present invention can be combined. For example, the memory addresses may simply have four trained binary variables; pitch, roll, yaw and depth. During training all of these values are stored for each object position and during recognition these values are read from memory. A sphere reduces training combinatorics and isolates the depth related error analysis. Also, for training a sphere can be placed at various distances. With a combination of selected embodiments of the present invention, the centroid of the object can be determined and the camera then centered thereabout. Camera to object distance is then stored in hash memory locations. For recognition, spheres can be placed at random distances within the trained range and hash depth values are then readout quickly without complex computations.

Figure 18:
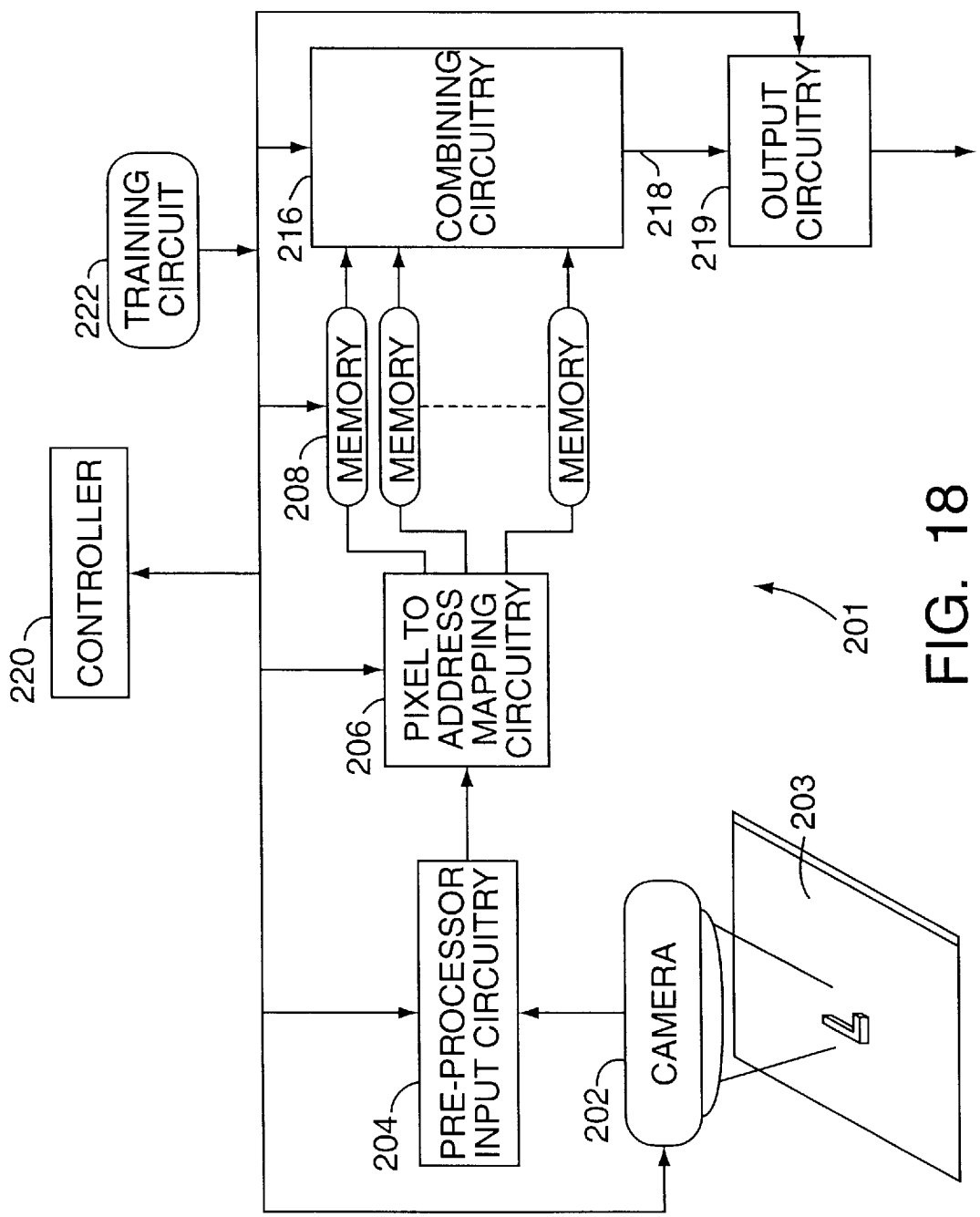
FIG. 18 is a simplified schematic illustration of an image recognition system provided according to the present invention.

FIG. 18 is a simplified schematic illustration of a character recognition system 201 of the type described hereinabove with respect to FIG. 1. A camera 202 receives optical signals from a substrate 203 having the overall pattern of interest thereon. The camera can be inherently digital, such as a CCD device or equivalently, an analog device coupled to a analog to digital converter can be used as indicated schematically by pre-processor 204. A sequence of signals configured in a signal array of the type detailed above, including signals denoting the overall pattern are configured into a plurality of signal sub-arrays, each of the signal sub-arrays having a digital pattern corresponding to a portion of the overall pattern. A hashing mechanism 206 maps each of the signal sub-array digital patterns with an associated memory 208–212 each containing a set of possible solutions. The outputs from the memories are signals on lines 214 indicative of the several stored signal sequences (multiple hypothesis set) corresponding to multiple sub-array digital patterns. The mechanism 216 combines the signals indicative of each memory's hypothesis set to generate signals on line 218 indicative of the solution set for an overall pattern. The solution set may be empty, contain a single member or in certain applications, more than one member whichever is unanimously indicated by the combination of all of the identified memory signals. Output circuitry 219 is employed for appropriate post recognition data reformatting as necessary for the specific application environment. The binary set representation vector could be the output, which requires no processing, or the characters might be converted to ASCII or other symbol codes. All of the above actions are governed by signals from controller 220. Training circuitry 22 is employed to control the set union of the existing memory values with the desired symbolic name for the current imaged input.

The above system has been described generally, but those skilled in the art will note that the system hardware and circuitry is all of a known type marketed by a variety of computer and digital signal processor vendors. The signal processing requirements of the present invention are so simple that an Intel 386 brand processor may be employed. An embodiment of the present invention as set forth above is capable of generating output signals indicative of the rotation angle of an object without any special hardware in less than 1 second. Determining vertical tilt and horizontal tilt, in addition to rotation, however, will not triple the present system's response time. In fact, the only time increase will be the time needed to read-out the additional characters at the input/output (I/O) data rates. In fact, all of the above parameters can be obtained with only a negligible increase over the time needed to yield the rotation data.

A key point of departure of the present invention over the prior art is the elimination of numerous computations during each operation. Regardless of the specific application, character recognition, range finder or the like, the present system avoids the feature extraction, analysis and correlation computations normally linked with segment association for characters, distance computations for range finders and centroid calculations for robotic vision, etc. As a result the speed of the present system is vastly improved over corresponding prior art devices and the cost of the present system is dramatically reduced since the hardware requirements are simplified.

While all of the "pixel hashing" presentation, heretofore, has dealt with binary data in a single image frame, the present invention also can be extended to gray level, color, or temporal frame sequences.

For data with n bits of gray level definition, the single binary (black and white) plane is replaced with n binary planes. For 256 shades of gray (in equals 8), 8 bit planes are used to capture the most significant to the least significant bit of the digitized pixel values. Each of these planes is still binary and is therefore partitioned and "hashed" as described herein. The number of memory banks and registers increases by a factor of 8, but is still quite reasonable. For color, the replication is increased by another factor of 3. With 256 gray levels, the set intersection (or summation) operations for recognition and the set union (or load) operations for training are also increased by a factor of 8. In other respects, however, the training and recognition processes are essentially equivalent to those described above.

For temporal data, which is normally represented as a sequence of frames, the same replication of the above described "pixel hashing" techniques is applied across 2 or more frames. The set intersections or summations occur across multiple frames distributed in time. For example, such embodiments enable an imaged object's velocity relative to the camera field of view to be stored in and read out from the "pixel hashed" memory locations. The "pixel hashing" is either applied to the results of frame-to-frame subtraction or applied directly to the multiple frames, depending on the requirements of the specific application. The enabling "pixel hashing" technologies are those processes described herein.

The present invention also anticipates embodiments in which one or more characters are presented to the system simultaneously. In certain applications such as those using robotic vision or in assembly line quality control, the system may view a conveyor belt which contains a plurality of objects. Should a pencil lie on top of a hammer, known systems would not recognize the image to be of two distinct objects for which the system has already been trained. Similarly, in character recognition applications where adjacent characters touch due to imperfections in the print, the prior art is not easily capable of recognizing the composite image formed by the two characters. Rather, known systems view the composite image as a new character or, alternatively, one which the system does not recognize.

Figure 19:
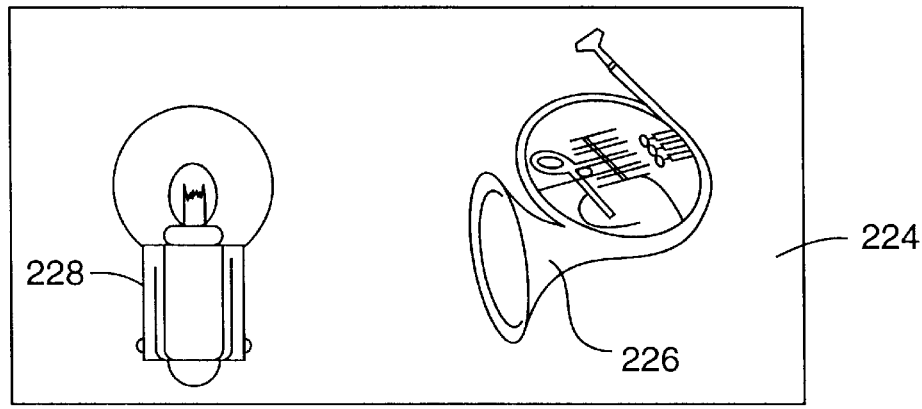
FIG. 19 is a diagrammatic illustration of a scene having two objects as viewed by a camera used in an alternative embodiment of the present invention.
Figure 20:
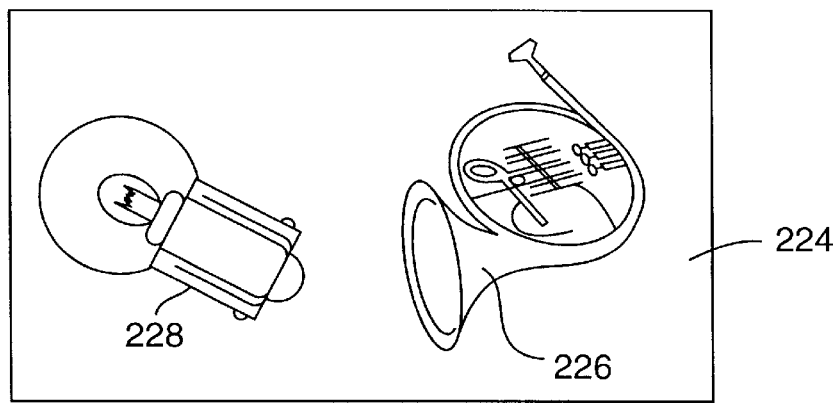
FIG. 20 is a diagrammatic illustration of the scene of FIG. 19 in which one object is rotated.
Figure 21:
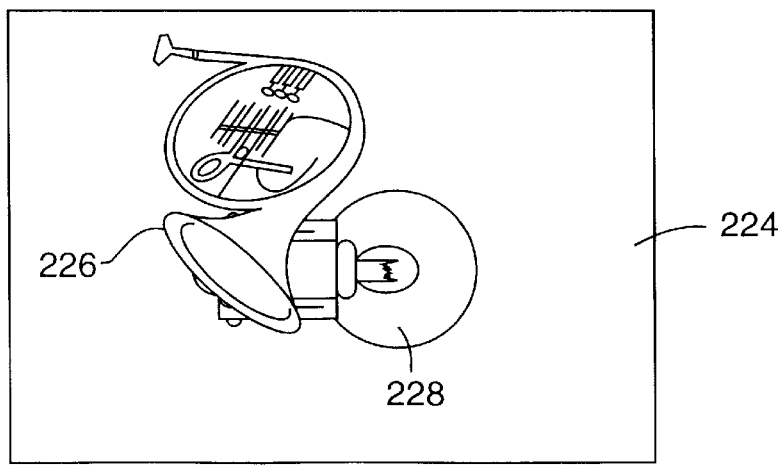
FIG. 21 is a diagrammatic illustration of the scene of FIG. 19 in which one object partially blocks the other from the camera's view.

A system as described above is quite capable of recognizing individual objects as they are presented in sequence. However, should more than one object be in the camera's view or should one of the objects be placed one on top of the other and thereby occlude the system camera's view of one object, the plurality of pixel patterns will no longer correspond to pre-trained values for the individual objects. FIG. 19 is a diagrammatic illustration of a scene 224 viewed by a camera used in an alternative embodiment of the present invention having both a horn 226 and a light bulb 228. In FIG. 20, the light bulb is rotated with respect to its position of FIG. 19, while the horn partially blocks the camera's view of the bulb in FIG. 21.

The present system can be readily extended to one which performs internal training. That is; the system is configured to create "synthetic images" in which the system "imagines" what it is that could be seen. These synthetic images are combinations of the images which the present system has already been trained to recognize. Occluded images of one or more of the previously trained objects or characters are readily discerned by the present invention as above since the data is binary, that is the pixels are either on or off. As such, the system only views profiles of the different objects. Recognition is also possible if "fused" training is provided.

As detailed hereinabove, pixel hashing as provided by the present system divides a pixel array into a set of binary registers. Each register has its own memory. A binary number in each register is an address which points to a single location in each memory. Each memory location points to a "hypothetical" set of all object names or characters that could have generated the pixel sub-array that corresponds to the register address. When a scene is viewed by the present system, the corresponding registers each retrieve the hypothetical set of answers with the intersection set generated therefrom. Consequently, only objects common to all of the memory addresses will be in the solution.

Figure 22:
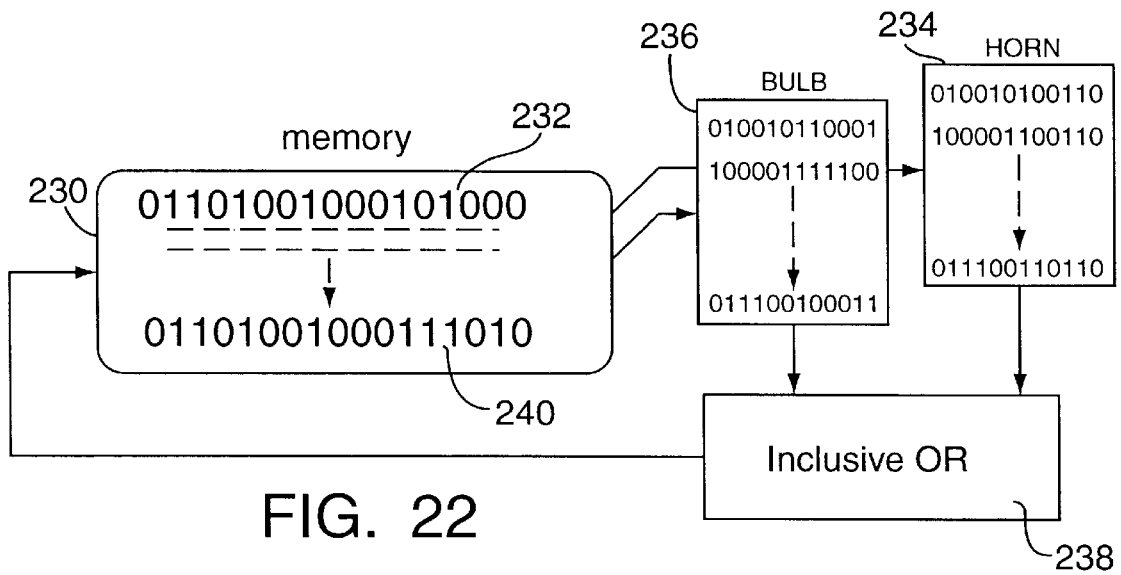
FIG. 22 is a simplified schematic illustration of a memory used with combination or "fusion" of training data in an image recognition system provided according to the present invention.

Combination or "fusion" of training data is provided by the present system for any combination of objects or characters that already are known. For example, if a horn and light can appear simultaneously in a scene as in FIG. 19, then separate training data sets for the horn and light are combined. An example is shown diagrammatically in FIG. 22. Memory 230 has at least one address 232 which points to a corresponding hypothesis set containing the possible objects to which that sub-array pixel configuration could correspond. For each pixel hashing memory the present system initially locates all addresses that point to the first object e.g. the horn, and places those addressed on a list in a separate location in memory, illustrated by list 234. All addresses in memory that point to the second object, the bulb, are placed on a second list 236. For each of the individual memories each address of that memory's respective first and second list are combined using an inclusive "OR" operation 238 to form a new address 240. The contents of this new address will be "loaded" with the inclusive "OR" of the contents of the 2 original addresses, thus insuring that both horn and bulb solutions are inclusive OR'd into the new memory address's hypothesis set.

As a result, the combinations of elements or characters can be effectively recognized with little modification to the basic process set forth above. Moreover, given the vast amounts of memory available, large combinations of elements can easily be accommodated without suffering the combinatorial explosion which would otherwise occur. Using the horn and bulb example, if 40 pixel hashing memories were being used and there was only one instance of a horn address and one instance of a bulb address for each, then 40 new addresses would be created and updated with both the horn and bulb solution.

The present invention would also be useful in situations where occlusion occurs. That is, in situations where one object blocks the camera's view of one or more objects. Occlusion is readily accommodated by the present invention as two state (black and white) video signals require no modifications to the procedure. Other variations are possible, for example, the horn may be rotated and translated before being fused with the bulb, a situation illustrated in FIG. 21.

Another alternative embodiment of the present invention is used in object recognition applications to rapidly calculate an object's first moment of inertia. In certain applications it is desirable to compute the first moment to center objects before the recognition process is completed and before any determination of the amount of rotation about the central point is ascertained. First moment determination provides a very large reduction in the number of training situations that must be "learned" by the system. If the object is not first centered, each rotation has to be "learned" at all possible horizontal and vertical displacements. A system provided in accordance with the present invention provides computational speed over the traditional procedure.

The centroid or first moment of any pixel array can be calculated by simply scanning the pixels. Should a pixel be "on" (i.e., black), an area counter is incremented and its X & Y coordinates are summed to respective X+Y moment counters. When scanning is completed, each sum is divided by the area to provide the centroid values of X & Y. A system provided according to the present invention can accomplish this process in one of two ways. The first being independent of object shape or geometry and the second being shape dependent. Moreover, the shape independent process can be used prior to recognition and the second shape dependent method can be used after character or object recognition.

Figure 23:
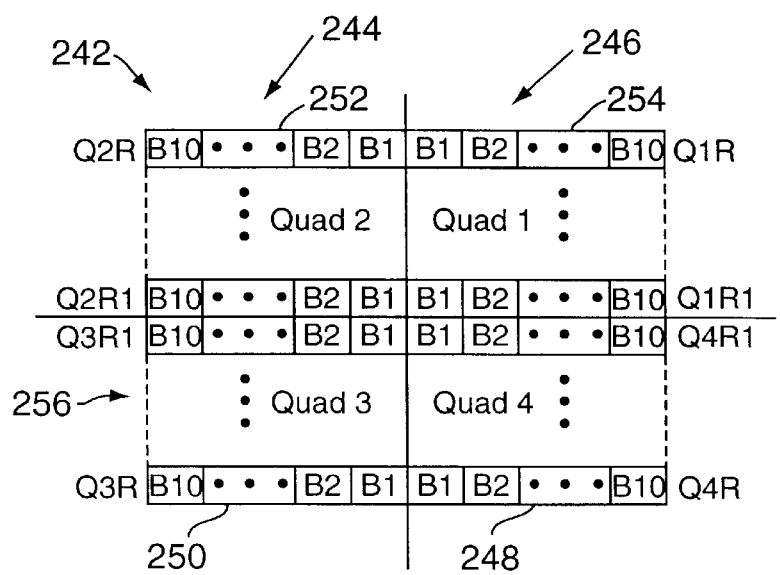
FIG. 23 is a simplified schematic illustration of a pixel array used with a centroid recognition system provided according to the present invention.

As shown in FIG. 23, the pixel to register mapping is laid out symmetrically. Array 242 is divided into four, two dimensional sub-arrays 244–250 each of which is one quarter of the dimension of the array. Each sub-array is comprised of linear sub-arrays, such as linear sub-array 252 of two dimensional sub-array 244 corresponding to pixel registers. Each linear sub-array, in turn, has elements of bit cells 254. Care is taken to have bit cells index monotonically from the center of each linear array toward array perimeter 256.

In the example of FIG. 23, each of these 40 registers provides a hash address to a 1,000 word memory bank as set forth above. However, in this embodiment, each memory location contains 3 numeric variables instead of set variables. The 3 variables provide the area, horizontal moment, and vertical moment contributions corresponding to the portion of the pixel array covered by the respective address register. Instead of set intersection operations between hash memory locations as above, the 3 variables are summed across all of the registers in the array (40 in the present example), then the area sum is divided into both horizontal and vertical sums to produce the horizontal and vertical components of the centroid. For the array 242, this method is 10 times faster than traditional algorithms because the 3 additions per pixel for each of 10 pixels per register have been replaced with the hash table look up; i.e., 3 additions are done per register rather than 3 additions per pixel. Since there are 10 pixels per register there is a 10 to 1 improvement in computational performance. The performance advantage of the present invention scales linearly with the number of pixels per register.

This method also does not require the 40 separate memory banks of the previously described pixel hashing embodiments, although that configuration retains utility for some systems characterized by parallel processing. If the register and bit numbering are configured as shown in FIG. 23, this symmetry will insure that ten 1,000 word memory banks can return the area and moment contributions for all 40 registers, a 4 to 1 savings in memory. The sign of the value retrieved is adjusted on a quadrant basis, i.e., the horizontal component is always positive in sub-arrays 246 and 248, negative in sub-arrays 250 and 244. Similarly, the vertical component is always positive in sub-arrays 244 and 246 while negative in sub-arrays 248 and 250. However, even if 40 memories are used, absolute values are stored, since including the sign requires another bit for each of 3 variables or 3 bits for each of 40,000 words. Therefore, with both approaches, the system preferably assigns the sign by quadrant location.

An additional 5 to 1 memory saving can be achieved by having vertical as well as horizontal registers covering the pixel array. For the above example, the area contribution and the x-moment contributions will be the same for all registers so only 1 bank of 1,000 words is needed. However, the y-moment contribution does vary as a function of register number. If a set of 40 vertical registers is also provided, then the y-moment table is the same for each of vertical registers. This option reduces 10 thousand words of required memory to 2 thousand words.

The primary advantage provided by this embodiment of the present invention is speed. The first method disclosed above is a factor of 10 faster than the traditional algorithms for computing first moments while the second method is a factor of one hundred times faster. Those skilled in the art will note that rearrangements of the pixel to hash register mapping changes in the number of registers, and changes in the number of bits per register are extensions of the present invention. For example, an embodiment using 20, 20 bit registers for the shape dependent method is readily contemplated. Since memory can be shared by all registers, a 20 bit register only require 1 million memory locations rather than the 20 million mandated for other pixel hashing embodiments. As the 20 million register requirement is not easily incorporated into certain embodiments set forth above, it is sometimes preferable to use 10 bit registers, depending on application. However, one million memory locations make a 20 bit register approach feasible for moment calculations.

For the 20 by 20 pixel array shown in FIG. 23, if the object is totally within the field of view and centered then the maximum pixel displacement is 20, either (vertically or horizontally) before the object disappears. Thus 20 bits and a sign bit in each memory location (42 bits to represent both directions) are required if each bit position represents a possible displacement. If binary coding is used, 5 bit "tokens" are needed for each direction or 10 bits per hash word. With these notations, algorithms for determining rotation can readily be modified to accommodate centroid calculations in accordance with the shape dependent technique disclosed herein.

Another alternative embodiment of the present invention has utility as a rank order filter. As is known in the art, rank order filters can be used in signal processing for sonar, radar and machine vision applications. Median filters are also known, being a species of that generic class of filter. Filters are frequently used to remove noise from a sensor's data stream. Most filters employed in signal processing applications are "mean" filters because they are relatively easy to implement with both digital and analog techniques. Mean filters are also known as Fourier or Weiner filters. If the filter functions are transformed via Fourier theory to the frequency rather than the time or spactial domain, they essentially block or eliminate a particular band of frequencies which contains noise. Unfortunately, the blocked frequency band also contains valuable signal information so that harmful noise is reduced along with a reduction in signal quality. In these cases a median filter can often be used to remove the noise without damaging the signal because the median filter does not operate in Fourier frequency space. Median filters have not been widely used because they are computationally expensive.

Figure 24:
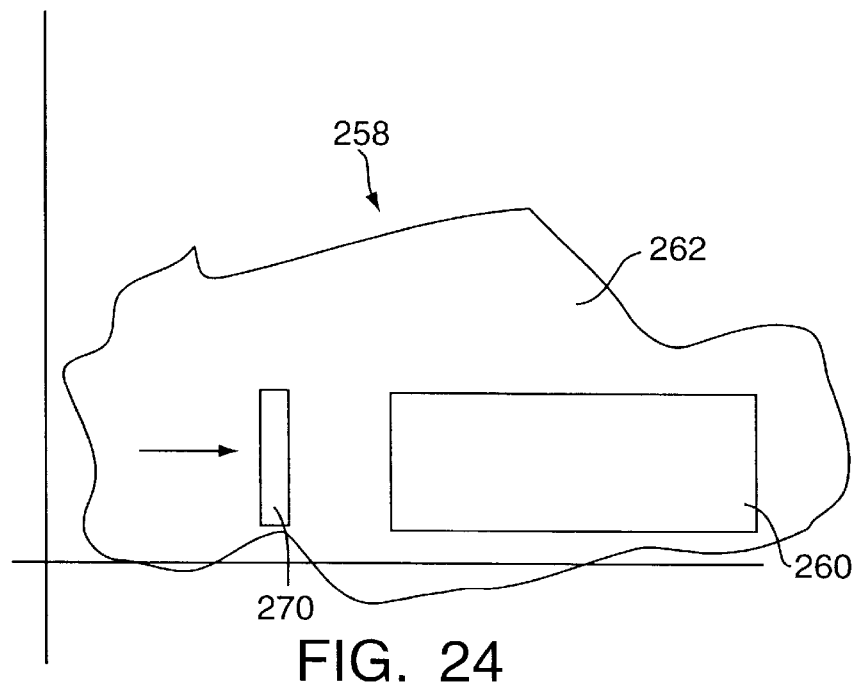
FIG. 24 is a simplified schematic illustration of an optical image and pixel sampling window used with a median signal filtering system provided according to the present invention.
Figure 25:
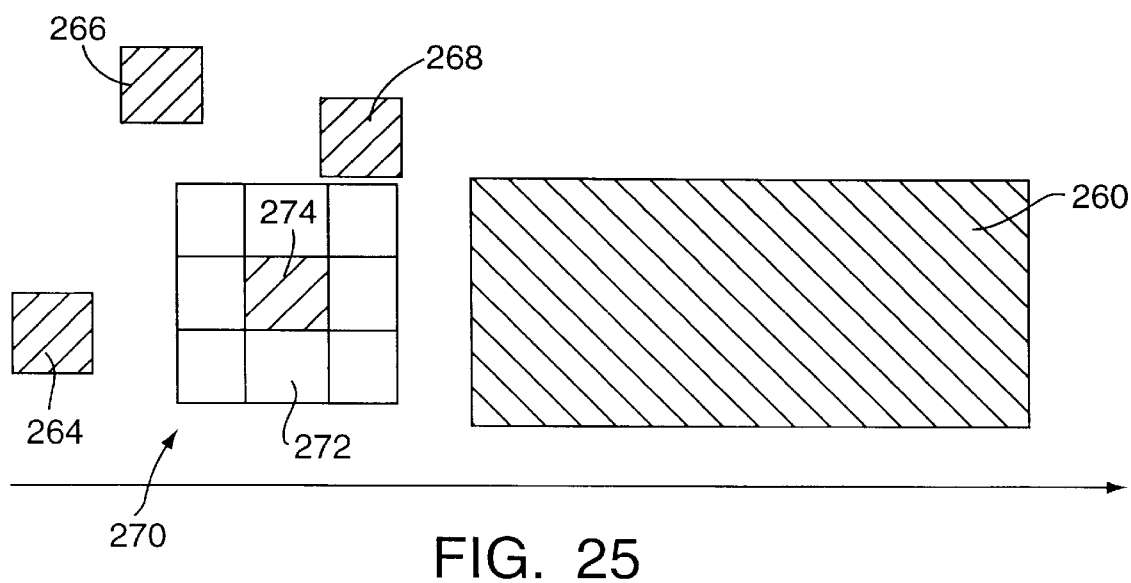
FIG. 25 is a simplified schematic illustration of a portion of the optical image and pixel sampling window of FIG. 24 showing noise pixels.

Referring now to FIGS. 24 and 25, there is shown a diagrammatic illustration 258 of a portion of a optical image feature 260 in the presence of shot or speckle noise 262. In image applications, "shot", spot, or speckle noise, is often present evidenced by isolated, turned "on" pixels, such as pixels 264–268. As is well known, image sensors provide signals which are composed in part of speckle yielding images that are characterized by random pixels either being improperly set to the opposite state. That is, white pixels are turned on and black pixels are turned off.

When a mean filter of a known type is applied to a signal such as image 260, the result is a rounding of the sharp corners since high frequencies are cut off by the filtering process. For Gaussian distributed data this problem is not cured by resorting to other types of filters such as median filters since the mean, median and mode are the same. A mean filter is simple to implement because it merely computes a running root-mean-square (RMS) average for the neighborhood and places that average in the central cell. Running averages are easy to compute because the divisor in each average is a constant equal to the number of pixel cells. The new average can be computed directly from the old average by incrementally subtracting the oldest cell's contribution and adding the newest cell's contribution to the running average for each shift of the convolution window. The remaining cells are unaffected and do not need to be recomputed. A running sum of squares is actually updated as the boundary cells change. These mean filters are also known as "smoothing" functions because of the effects of this running average.

As is well known, median filters are a specific example of rank order filters. Median filters essentially divides the population in half whereas rank order filters divide the population according to percentiles, i.e., 90%, 10%, etc. For a median filter, the median must be determined for all of the data in the window, this median value is then used either as the central value or as a decision threshold for the central value. Most algorithms for median filters must re-sort the data within the window for each window position to determine the median, which will always be the middle value in a sorted list. That is; the median splits the population in half. Algorithms for sorting typically require n log n steps, where log is base 2 and n is the number of cells in the window. Thus, for a 16 cell linear (1 dimensional) window n log n is 64 operations. In contrast, a mean filter requires 2 adds, 1 square, 1 division, 1 square root and 1 division; or approximately 14 operations, a factor of 4 less. As the linear window becomes larger in pixels, this disparity increases since the computations for the mean stay the same. For a 32 cell linear window, the median requires 160 operations, or a factor of 11 more than a mean filter. For acoustic or optical images, the convolution widows are usually 2-dimensional, which further complicates the calculations.

Median and mean filters both use a convolutional inspection window 270 having a plurality of pixel cells 272 for a select neighborhood to determine the value for a central cell 274 in that neighborhood. The window is convolutional in that it must shift through all possible overlap positions, i.e., it must be centered on all cells in the data stream to determine that central cells correct restoration value. The window is shifted one pixel to the right for each computation. The center pixel is then stored in an output filter signal memory. As is done in other filtering configurations, the output filter is configured to be shrunk in size by the size of the convolution window. In sum, the center value of the convolution window is determined by the "neighborhood" in which the pixel reside . That is, the state of the outlying pixels as well as the center pixel determine the new state of the center pixel.

For a two dimensional pixel field as shown, the median filter must remove isolated pixel noise without altering pixels which are strongly connected to their neighbors and thereby "blur" the crisp edges of objects as a side-effect of removing an isolated pixel because the same high frequency information is present in the abrupt "step-response" associated with a single noise pixel and in the abrupt "step-response" associated with the edge of an object. The effect of this in terms of reducing noise without a corresponding reduction in signal quality is readily seen. As the convolution window receives the image signal, a "zero" will be returned by the system indicating no signal until fifty percent of its pixels are determined to be turned on or at least fifty percent of the convolution window is within the object. A one will be returned for all positions in which more than 50% of the convolution window is within the object. Even in the presence of noise, this situation should occur only when the convolution window receives the image signal. For the 9 pixel convolution window as shown, then the median equals one if five pixels are black. If four are black, then the median equals zero.

For any specific window pattern, both the mean and the median are functions of the pixel values returned by the system. Appropriate response values can be stored at each register in each memory so that the present system operates in a look-up table manner. When the hash register for a set of pixels is indicated, that memory location can return either the mean, the median, or both if those values have been stored during a training cycle. A square, two dimensional window is preferred, such as the 3×3 array of FIG. 25. Other arrays of 4×4 and 5×5 pixels can be used. These require 9, 16 and 25 pixels which map to hash address spaces of 512, 65 thousand and 32 million words, respectively. The first two are easy to implement and the 3rd is possible, but not currently practical in terms of memory size. The primary advantage of the present system is speed. One memory lookup replaces 14 computational operations for mean filter in the above example and 64 operations for the median filter with a 5×5 pixel array.

In operation, the array is divided into sub-arrays as above. Each sub-array returns signals indicative of either the presence or absence of an image. In the 3×3 example of FIG. 25 addresses corresponding to a majority of pixels in that sub-array being "on" or black such as 011, 101, etc. return signals indicative of the presence of a feature whereas those addresses corresponding to a minority of enabled pixels such as 001, 100, 000 return signals indicative of no feature. Each sub-array then "votes" for the presence or absence of a feature, with the system outputting signals corresponding to the prevailing majority. Those skilled in the art will note that a simple majority is all that is needed for median filters.

Alternatively, t he system can be configured to have each address return a numerical value corresponding to the number of enabled pixels for that sub-array. The total number of enabled pixels for the array is determined and divided by the total number of pixels in the array. Should that number be greater than one half of the total array pixels, then the system returns a "1", indicating the presence of the feature. This adding of sub-array response values is used to overcome the intractability of 32 million memory words, referenced above, for the 25 pixel window.

Another feature of the present median filter embodiment results from the look-up table format used. There is no need for the system to employ separate memories for each of the sub-arrays. The system can utilize a single table, since numerical data is returned for each address regardless of the sub-array. Moreover rank order filters of different value can be readily generated with the present system by simply varying the threshold percentage of enabled pixels needed to constitute a "voting" majority. Consequently a 90% filter is achieved by simply raising the pixel threshold to 90% of the total pixels in the array. Similarly, a 10% the filter is created by lowering that value to 10% of the total number of array pixels. These rank fitters, respectively, thin or thicken the imaged object.

Figure 26:
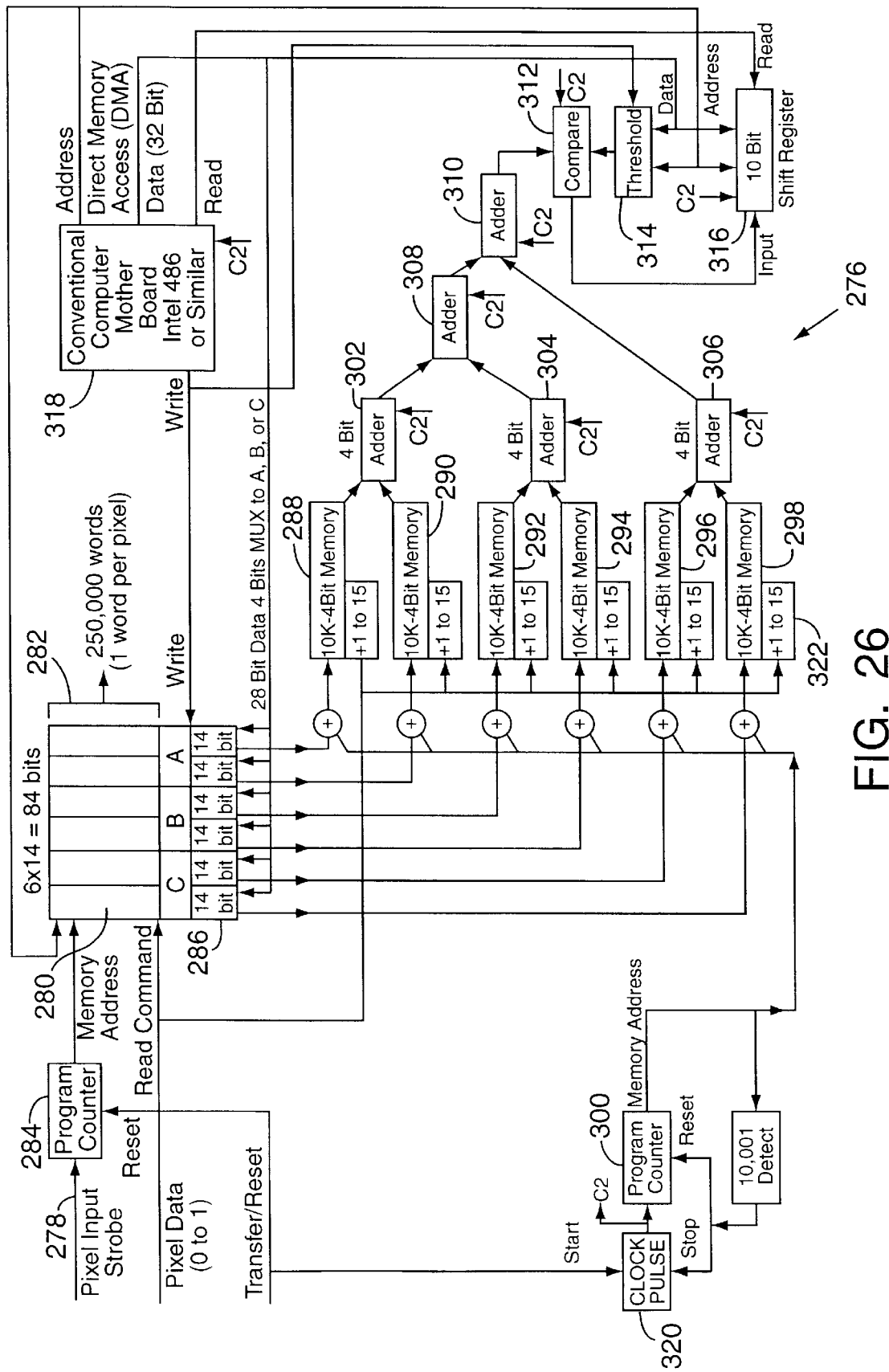
FIG. 26 is a simplified schematic illustration of a circuit used with an image recognition system provided according to the present invention.

FIG. 26 is a simplified schematic illustration of a circuit 276 used in an image recognition system provided according to the present invention. Circuit 276 is an embodiment of circuitry 206 that is preferred for some, high frame rate applications. The circuit receives a serial data stream on line 278 from a 500×500 pixel array and maps each pixel signal to a maximum of 6 separate bit cells 280 located in 1,000 ten bit registers. These 250,000 pixels are mapped to a minimum of 10,000 bit cells (1 to 1 mapping) and a maximum of 60,000 bit cells (1 to many mapping) in less than 1/60 of a second. The pixel to register bit-cell mapping can be altered under software control.

A program (sequence) counter 284 steps through 250,000 memory locations in synchronization with the arriving pixel data. Each memory word contains 84 bits. These 84 bits are read out in parallel on 6–14 bit address channels 286. Each of these channels is routed to a separate 10,000 word memory bank (banks 288–298). If the incoming pixel is "on", i.e., a binary "1", then the contents of all six memory banks are incremented at their respective addresses. The circuit uses 4 bit words in the 6 memory banks, thus limiting the maximum count to 15. After this maximum is reached, the circuit insures that future increments are ignored to prevent a wraparound to zero.

Once all of the 250,000 pixels have been serially scanned, a second program counter 300 sequences through all six memory banks in parallel. Their output signals are added through an adder tree comprised of adders 302–310 to provide a total count at each address across the 6 memory banks. This output signal is compared at comparator 312 to a software setable threshold register 314 to decide if the corresponding bit cell should be "1" or "0". The resulting stream of "1" s and "0" s proceed to a 10 bit shift register 316 for a bit serial to 10 bit parallel conversion. Thus, 10,000 serial bits are converted to 1,000 serial 10 bit registers. These 1,000 registers are then used, by a conventional computer 318 to reference the 1,000 hash memory banks each with 1,000 banks each with 1,000 words corresponding to the 10 bits in each register. Other circuits employed are clock signal generator 320 and overflow detect circuit 322.

The conventional serial computer provides adequate speed for both the training and recognition routines with the above circuitry. The above circuitry is needed for the pixel to hash register mappings which are the computationally difficult portion of the hashing algorithm. The mapping function can be changed by loading a different set of values in the 250,000×84 bit memory bank. When a "1 to 1" mapping is used, only 14 bits of the 84 bits are needed and only 1 of the 6,10,000 word memory counter banks is needed. The adder tree is also unnecessary when a "1 to 1" mapping is employed. A system employing circuitry 276 replaces software with hardware to achieve a process speed that is adequate for a 60 frame per second TV camera. Faster training is enabled, including dynamic training during operation in recognition modes, as well as faster recognition mode operation overall.

Similarly, although the invention has been shown and described with respect to a preferred embodiment thereof, it will be understood by those skilled in the art that various changes omissions and additions thereto maybe made therein without departing from the spirit and scope of the present invention. The term "image", as used in this patent application, is not restricted to the notion of a two dimensional photograph, but is intended to include any image, without regard to dimensionality or sensor type. For example, in the preferred embodiment, the signals received by the present system were optical. However, in other applications the received signals can be acoustical or even indicative of elastic waves with only minor modifications to the preferred embodiment. For example, a microphone's output of electrical signals is considered a projection of sound waves onto a one dimensional string of digital samples, thus forming an image of the sound.

While the term "pixel" is used in the art as an acronym for "picture element" (1 discrete sample in the 2 dimensional array of samples that represent a photograph), as used herein, a pixel is actually a discrete data sample from any sensor type without regard for dimensionality. Therefore, the present invention has applications in the fields of radar, sonar and infra-red target detection and tracking, speech recognition and understanding, music recognition and understanding, medical x-ray interpretation, and other analogous fields. The generality of the processes to which the teachings of the present invention are applicable can best be understood in terms of signal processing, feature extraction, pattern recognition, scene analysis, and scene understanding.

I claim:

1. A system for pattern recognition comprising:
    a receiving means receiving a sequence of signals configured in a signal array, including signals denoting an overall pattern;
    a configuring means for configuring said signal sequence into a plurality of signal sub-arrays, each of said signal sub-arrays responding to a portion of said overall pattern;
    a hashing means for mapping each of said digital pattern signal sub-arrays to an address in an associated memory having a set of stored signals corresponding to possible overall patterns;
    a return means for retrieving said possible overall pattern signals from each of said mapped addresses; and
    a combining means for combining said retrieved possible overall pattern signals and generating therefrom identification signals indicative of the overall pattern unanimously indicated by the combination of all of said retrieved possible overall pattern signals.

2. The system of claim 1 wherein said signal array comprises signals received from a signal database.

3. The system of claim 1 wherein said possible overall pattern signals identify a plurality of overall patterns, each having signals that correspond to said identified overall pattern.

4. The system of claim 3 wherein said combining means further comprises means for assigning equal weight to each of said possible overall pattern signals such that said identified overall pattern corresponds to the overall pattern identified by all of said memories.

5. The system of claim 3 wherein each of said possible overall pattern signals identify a set of overall patterns and wherein said identified overall pattern corresponds to the intersection set of said overall patterns.

6. The system of claim 1 wherein said overall pattern corresponds to an image formed by digital signals.

7. The system of claim 1 wherein said signal sequence corresponds to an array of digital signals of equivalent received optical pixels and wherein said overall pattern corresponds to an optical image.

8. The system of claim 1 wherein said signal sequence corresponds to an array of digital signal equivalents of received discrete acoustical signals and wherein said overall pattern corresponds to an acoustical image.

9. The system of claim 1 wherein said signal sequence corresponds to an array of digital signal equivalents received at discreet temporal intervals.

10. The system of claim 7 further comprising a means for configuring said pixels in an N by M array.

11. The system of claim 10 further comprising a means for configuring each of said sub-arrays into a dimension 1 by M.

12. The system of claim 10 wherein said sub-array pixel signals comprise $2^M$ pixel signal digital patterns and each of said signal digital patterns has a unique associated memory address.

13. The system of claim 12 wherein said combining means further comprises a means for associating each of said memory addresses with respective portions of said optical image.

14. A system for pattern recognition comprising:
    a receiving means receiving a sequence of signals configured in a signal array, including signals denoting an overall pattern wherein said signal sequence corresponds to an array of digital signals of equivalent received optical pixels of an optical image;
    a configuring means for configuring said signal sequence into a plurality of signal sub-arrays, each of said signal sub-arrays having digital pattern signals corresponding to a portion of said overall pattern wherein said sub-array pixel signal, comprise $2^M$ pixel signal digital patterns
    a means for configuring said pixels in an N by M array;
    a hashing means for mapping each of said digital pattern signal sub-arrays to an address in an associated memory having a set of stored signals corresponding to possible overall patterns and each of said signal digital patterns has a unique associated memory address;
    a return means for retrieving said possible overall pattern signals from each of said mapped addresses; and
    a combining means for combining said retrieved possible overall pattern signals and generating therefrom identification signals indicative of the overall pattern unanimously indicated by the combination of all of said retrieved possible overall pattern signals; wherein said optical image is one of a plurality of optical images and a means for returning, in dependence on said memory address signal value, signals indicative of at least one of said optical images in said optical image plurality.

15. The system of claim 10 further comprising a means for configuring each of said sub-arrays into dimension J by K.

16. The system of claim 11 wherein each of said M pixels in said sub-arrays is configured in a sequence of M bits, said system further comprising a merging means for combing each of said M bits, adjacent pixels in a plurality of said sub-arrays and generating a logical "1" signal for a bit should any of said corresponding adjacent pixels correspond to a logical "1".

17. The system of claim 16 wherein each of said sub-arrays are of dimension 1 by M and wherein said comparator compares at least three of said adjacent sub-array signals.

18. The system of claim 10 wherein each of said sub-arrays are linear in dimension and are comprised of pixels randomly selected from said N by M array.

19. The system of claim 10 wherein said sub-arrays ate of dimension 1 by M and are comprised of pixels selected so as to extend said sub-arrays diagonally in relation to said N by M array.

20. The system of claim 14 wherein said plurality of optical images respectively correspond to a single selected figure imaged at selected distances from an origin.

21. The system of claim 14 wherein said plurality of optical images respectively correspond to a single selected figure imaged at selected rotational positions as compared to an initial figure position.

22. The system of claim 20 wherein said plurality of optical images correspond to a single selected figure imaged at selected positions rotated about a selected one of a yaw, pitch and roll axis.

23. The system of claim 21 wherein said yaw, pitch and roll axes have their intersection at the center of said object.

24. The system of claim 1 further comprising a training apparatus for use in assigning, for each of said sub-arrays, signals corresponding to portions of said overall pattern to an address of said associated memory.

25. The system of claim 24 wherein said training apparatus further comprises a means for assigning an address in a one of said memories to a one of said signal sub-array digital patterns.

26. The system of claim 24 wherein said training apparatus further comprises a means for assigning an address in a one of said memories to a new one of said signal sub-array digital patterns should a given signal sub-array digital pattern be determined to be non-identical with known signal sub-array digital patterns.

27. A method of pattern recognition comprising the steps of:
   receiving a sequence of signals configured in a signal array, including signals denoting an overall pattern;
   configuring said signal sequence into a plurality of signal sub-arrays, each of said signal sub-arrays having digital pattern signals corresponding to a portion of said overall pattern;
   mapping each of said signal sub-array digital pattern signals to an address in an associated memory having a sequence of stored signals corresponding to possible overall patterns;
   retrieving said possible overall pattern signals from each of said mapped addresses; and
   combining said retrieved possible overall pattern signals and generating therefrom identification signals indicative of the overall pattern unanimously indicated by the combination of all of said possible overall pattern signals.

28. The method of claim 27 further comprising the steps of configuring said sub-array digital patterns so that each of said sub-array digital patterns correspond to a unique associated address in a memory.

29. The method of claim 26 further comprising the steps of configuring said identification signals to identify a plurality of overall patterns, each having signals that correspond to said identified overall pattern.

30. The system of claim 24 wherein said training apparatus further comprises a means for combining said signals in a set union operation.

31. The system of claim 1 wherein said combining means further comprises a means for merging during training at each of said sub-arrays, desired new identity memory signals with signals corresponding to prior training of a portion of said overall pattern using a set union operator.

32. The system of claim 1 wherein said hashing means further comprises a means for approximating said digital pattern portion signals to allow more than one of said possible digital pattern portions to be mapped to a memory address.

33. The system of claim 32 wherein said approximating means further comprises a means for truncating values of said digital pattern portion signals.

34. The system of claim 32 wherein said approximating means further comprises a means for increasing said digital pattern portion signals values to a higher value.

35. The system of claim 1 wherein said received signal sequence includes signals indicative of at least two overall patterns, said system further comprising:
   a means for identifying, for each of said sub-array memories, all addresses containing signals indicative of a first overall pattern;
   a means for identifying, for each of said sub-array memories, all addresses containing signals indicative of a second overall pattern; and
   a means for combining said first and second identified sub-array memory addresses to generate new signals for storage at a new address therein to ensure combination with previously generated identification signals.

36. The method of claim 27 further comprising the steps of:
   identifying, for each of said sub-array memories, all addresses containing signals indicative of a first overall pattern;
   identifying, for each of said sub-array memories, all addresses containing signals indicative of a second overall pattern; and
   combining said first and second identified subarray memory addresses to generate new signals for storage at a new address therein to ensure combination with previously generated identification signals.

37. The system of claim 1 wherein said signal receiving means further comprises a means for receiving signals of only two states.

38. A system for pattern recognition comprising:
   a receiving means for receiving a sequence of signals configured in a signal array, including signals denoting an overall pattern having a centroid and an area;
   a means for configuring said sequence of signals into a plurality of signal sub-arrays, each of said signal sub-arrays having a digital pattern corresponding to a portion of said overall pattern area;
   a hashing means for mapping each of said signal sub-array digital patterns to an address in an associated memory having a set of stored signals corresponding to numeric values respectively providing area, horizontal moment and vertical moment contribution signals for each of said memory addresses;
   a return means for retrieving said stored signals from each of said mapped addresses; and
   a combining means for combining said retrieved memory address signals and generating therefrom moment signals indicative of the horizontal and vertical components of said centroid.

39. The system of claim 38 further comprising a means for configuring said sub-arrays to be of n by n dimension.

40. A system for pattern recognition comprising:
   a receiving means for receiving a sequence of signals configured in a signal array, including signals denoting an overall pattern having a centroid and an area;
   a means for configuring said sequence of signals into a plurality of signal sub-arrays, each of said signal sub-arrays having a digital pattern corresponding to a portion of said overall pattern area;
   a hashing means for mapping each of said signal sub-array digital patterns to an address in an associated memory having a set of stored signals corresponding to numeric values respectively providing area, horizontal moment and vertical moment contribution signals for each of said memory addresses;
   a return means for retrieving said stored signals from each of said mapped addresses; and
   a combining means for combining said retrieved memory address signals and generating therefrom moment signals indicative of the horizontal and vertical components of said centroid wherein said combining means further comprises:
      a means for summing said area moment signals and generating a total area signal;
      a means for summing said moment signals indicative of vertical component of said centroid and generating a total vertical component signal;

a means for summing said moment signals indicative of horizontal component of said centroid and generating a total horizontal component signal;

a means for dividing said total area signal by said total vertical area signal and generating a vertical centroid signal; and a means for dividing said total area signal by said total horizontal area signal and generating a horizontal centroid signal.

41. The system of claim 38 further comprising a means for configuring said sub-arrays to be of 1 by n dimension.

42. The system of claim 38 further comprising a means for arranging said signal sub-array plurality about a center of said array such that each of said pixels in said array index away from said array center toward an array perimeter.

43. The system of claim 20 said identification signal generating means further comprises a means for storing a distance variable as a binary coded set with the most significant bit (MSB) having a weight equal to half of a desired dynamic range and the least significant bit (LSB) having a weight equal to a desired accuracy value.

44. A rank order signal filter system comprising:

a means for receiving a sequence of signals in one of two signal states, including signals denoting an overall pattern and noise signals corresponding to signals having a state opposite a desired state;

a means for configuring a selected portion of said signals into a signal sampling array having a central signal element, a means for configuring said signal array into a plurality of signal sub-arrays, each of said signal sub-arrays having digital pattern signals corresponding to a portion of said overall pattern;

a hashing means for mapping each of said digital pattern signal sub-arrays to an address in an associated memory having a set of stored signals indicative of a numeric value corresponding to the number of elements of said sub-array in a selected one of said signal states;

a return means for retrieving said stored signals from each of said mapped addresses; and a combining means for combining said retrieved memory address signals and generating therefrom signals adjusting the state of said center element in dependence on the numeric values said array elements.

45. The system of claim 44 wherein said signal sampling array is of even dimension.

46. The system of claim 44 further comprising a means for advancing said sampling array through said sequence of signals element by element and adjusting said center element state at each element.

47. The system of claim 44 further comprising a thresholding means for adjusting the state of said center element only if the numeric value indicated by said memory address signals exceeds a threshold.

48. The system of claim 47 wherein said elements correspond to pixels and wherein said thresholding means adjusts said center pixel state to an enabled state if at least one half of said pixels in said array have an enabled state.

49. The system of claim 44 further comprising a training means for storing in said memory addresses numeric signals indicative of the total number of enabled elements in a corresponding sub-array.

50. The system of claim 49 further comprising:

a means for generating, from said subarray, total number signals, signals indicative of the sum total of enabled elements in said array; and a comparing means for comparing said sum total signals with a threshold value and adjusting said center pixel state should said sum total signals exceed said threshold value.

51. An electrical circuit for use in a pattern recognition system, said circuit comprising:

a means for receiving a serial sequence of pixel signals, including signals denoting an overall pattern;

a means for configuring said signal sequence into a plurality of signal sub-arrays, each of said signal sub-arrays having digital pattern signals corresponding to a portion of said overall pattern;

a hashing means for mapping each of said digital pattern signal sub-arrays to an address in an associated memory having a set of stored signals corresponding to numeric values respectively providing area, horizontal moment and vertical moment contribution signals for each of said memory addresses;

a return means for retrieving said stored signals from each of said mapped addresses; and a combining means for combining said retrieved stored signals of said memory addresses and generating therefrom moment signals indicative of the horizontal and vertical components of said centroid.

52. The system of claim 1 wherein said signal sequence is serial and wherein said signal sequence receiving means further comprises a plurality of bit registers for mapping said signals into corresponding bit cells.

53. A system for pattern recognition comprising:

a receiving means having a plurality of bit registers for mapping said signals into corresponding bit cells for receiving a sequence of serial signals configured in a signal array, including signals denoting an overall pattern;

a configuring means for configuring said signal sequence into a plurality of signal sub-arrays, each of said signal sub-arrays having digital pattern signals corresponding to a portion of said overall pattern;

a hashing means for mapping each of said digital pattern signal sub-arrays to an address in an associated memory having a set of stored signals corresponding to possible overall patterns, said hashing means further comprises a plurality of memory banks configured to receive said signal sequence in parallel;

a return means for retrieving said possible overall pattern signals from each of said mapped addresses; and a combining means for combining said retrieved possible overall pattern signals and generating therefrom identification signals indicative of the overall pattern unanimously indicated by the combination of all of said retrieved possible overall pattern signals.

54. The system of claim 53 wherein said signal sequence comprises pixel signals and wherein the number of addresses in said memory banks is greater than the number of pixels in said signal array; said combining means further comprising adder circuitry for logically combining output signals from said memory banks and comparator means for logically comparing said adder circuitry signals to a threshold signal and generating logical "1" output signals should said adder circuitry signals exceed said threshold.

55. The system of claim 1 wherein said signal sequence comprises digital signals with n bits of grey level, said system further comprising n of said configuring means, n of said means hashing means and n of said combining means respectively configured to generate said identification signals for each of said grey levels, said system further comprising an overall grey level combining means for generating said identification signals from combined signals from said grey levels.

56. The system of claim 1 wherein said signal sequence comprises digital signals with n bits of color, said system further comprising n of said configuring means, n of said means hashing means and n of said combining means respectively configured to generate said identification signals for each of said colors, said system further comprising an overall color combining means for generating said identification signals from combined signals from said colors.

57. The system of claim 1 further comprising a temporal combining means for combining said identification signals from an initial signal array with identification signals from a subsequent signal array.

58. The system of claim 57 wherein said identification signals are indicative of the velocity of said overall pattern.

* * * * *

UNITED STATES PATENT AND TRADEMARK OFFICE
CERTIFICATE OF CORRECTION

PATENT NO. : 5,875,264
DATED : February 23, 1999
INVENTOR(S) : D. Carlstrom

It is certified that error appears in the above-identified patent and that said Letters Patent is hereby corrected as shown below:

Column 24, line 15: Please delete "signal" and substitute --signals--.

Column 24, line 49: Please delete "ate" and substitute --are--.

Column 27, line 65: Please delete the comma after "sub-array".

Signed and Sealed this

Sixth Day of July, 1999

Q. TODD DICKINSON

Attest:

Attesting Officer

Acting Commissioner of Patents and Trademarks